(12) United States Patent
Heap et al.

(10) Patent No.: US 8,112,207 B2
(45) Date of Patent: Feb. 7, 2012

(54) METHOD AND APPARATUS TO DETERMINE A PREFERRED OUTPUT TORQUE FOR OPERATING A HYBRID TRANSMISSION IN A CONTINUOUSLY VARIABLE MODE

(75) Inventors: Anthony H. Heap, Ann Arbor, MI (US); Tung-Ming Hsieh, Carmel, IN (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 671 days.

(21) Appl. No.: 12/254,898

(22) Filed: Oct. 21, 2008

(65) Prior Publication Data
US 2009/0118950 A1 May 7, 2009

Related U.S. Application Data

(60) Provisional application No. 60/985,382, filed on Nov. 5, 2007.

(51) Int. Cl.
*G06F 17/00* (2006.01)
(52) U.S. Cl. ............... 701/54; 701/21; 701/51; 477/181
(58) Field of Classification Search ............... 701/22, 701/51, 54; 477/181
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1* | 4/2005 | Cawthorne et al. ............. 701/51 |
| 2005/0080538 A1 | 4/2005 | Hubbard |
| 2005/0080539 A1 | 4/2005 | Hubbard |

(Continued)

OTHER PUBLICATIONS

2005. Syed, Smith, Ying. "Fuzzy Control to Improve High-Voltage Battery Power and Engine Speed Control in a Hybrid Electric Vehicle". Annual Meeting of the North American Fuzzy Information Processing Society, NAFIPS 2005—2005.*

(Continued)

*Primary Examiner* — Mary Cheung
*Assistant Examiner* — Truc M Do

(57) ABSTRACT

A hybrid transmission includes a torque machine and an energy storage device connected thereto. The hybrid transmission is operative to transfer power between an input member and an output member and the torque machine in a continuously variable operating range state. A method for controlling the hybrid transmission includes determining a preferred output torque, determining a relationship between power from the energy storage device and an output torque of the transmission, determining power constraints from the energy storage device, determining motor torque constraints for the torque machine, determining linear torque constraints to the output torque based upon the motor torque constraints for the torque machine, determining quadratic output torque constraints based upon the power constraints from the energy storage device and the relationship between the power from the energy storage device and the output torque of the transmission device, and determining an output torque to the output member responsive to the preferred output torque and achievable based upon the linear output torque constraints and the quadratic output torque constraints.

17 Claims, 11 Drawing Sheets

U.S. PATENT DOCUMENTS

| | | | |
|---|---|---|---|
| 2005/0080540 A1 | 4/2005 | Steinmetz | |
| 2005/0080541 A1 | 4/2005 | Sah | |
| 2005/0182526 A1 | 8/2005 | Hubbard | |
| 2005/0182543 A1 | 8/2005 | Sah | |
| 2005/0182546 A1 | 8/2005 | Hsieh | |
| 2005/0182547 A1 | 8/2005 | Sah | |
| 2005/0189918 A1 | 9/2005 | Weisgerber | |
| 2005/0252283 A1 | 11/2005 | Heap | |
| 2005/0252305 A1 | 11/2005 | Hubbard | |
| 2005/0252474 A1 | 11/2005 | Sah | |
| 2005/0255963 A1 | 11/2005 | Hsieh | |
| 2005/0255964 A1* | 11/2005 | Heap et al. ................ 477/3 |
| 2005/0255965 A1 | 11/2005 | Tao | |
| 2005/0255966 A1 | 11/2005 | Tao | |
| 2005/0255967 A1 | 11/2005 | Foster | |
| 2005/0255968 A1 | 11/2005 | Sah | |
| 2005/0256617 A1 | 11/2005 | Cawthorne | |
| 2005/0256618 A1 | 11/2005 | Hsieh | |
| 2005/0256623 A1* | 11/2005 | Hubbard et al. ............ 701/54 |
| 2005/0256625 A1 | 11/2005 | Sah | |
| 2005/0256626 A1 | 11/2005 | Hsieh | |
| 2005/0256627 A1 | 11/2005 | Sah | |
| 2005/0256629 A1 | 11/2005 | Tao | |
| 2005/0256631 A1 | 11/2005 | Cawthorne | |
| 2005/0256633 A1 | 11/2005 | Heap | |
| 2005/0256919 A1 | 11/2005 | Cawthorne | |
| 2006/0180363 A1* | 8/2006 | Uchisasai et al. .......... 180/65.2 |
| 2006/0194670 A1 | 8/2006 | Heap | |
| 2007/0078580 A1 | 4/2007 | Cawthorne | |
| 2007/0093953 A1 | 4/2007 | Heap | |
| 2007/0132409 A1* | 6/2007 | Wada et al. ................ 318/146 |
| 2007/0149348 A1 | 6/2007 | Holmes | |
| 2007/0191181 A1 | 8/2007 | Burns | |
| 2007/0225886 A1 | 9/2007 | Morris | |
| 2007/0225887 A1 | 9/2007 | Morris | |
| 2007/0225888 A1 | 9/2007 | Morris | |
| 2007/0225889 A1 | 9/2007 | Morris | |
| 2007/0260381 A1 | 11/2007 | Sah | |
| 2007/0276569 A1 | 11/2007 | Sah | |
| 2007/0284162 A1 | 12/2007 | Zettel | |
| 2007/0284163 A1 | 12/2007 | Heap | |
| 2007/0284176 A1 | 12/2007 | Sah | |
| 2007/0285059 A1 | 12/2007 | Zettel | |
| 2007/0285060 A1 | 12/2007 | Zettel | |
| 2007/0285061 A1 | 12/2007 | Zettel | |
| 2007/0285063 A1 | 12/2007 | Zettel | |
| 2007/0285097 A1 | 12/2007 | Zettel | |
| 2008/0004779 A1 | 1/2008 | Sah | |
| 2008/0028879 A1 | 2/2008 | Robinette | |
| 2008/0032855 A1 | 2/2008 | Sah | |
| 2008/0064559 A1 | 3/2008 | Cawthorne | |
| 2008/0064562 A1 | 3/2008 | Zettel | |
| 2008/0103003 A1 | 5/2008 | Sah | |
| 2008/0119320 A1 | 5/2008 | Wu | |
| 2008/0119321 A1 | 5/2008 | Heap | |
| 2008/0120000 A1 | 5/2008 | Heap | |
| 2008/0120001 A1 | 5/2008 | Heap | |
| 2008/0120002 A1 | 5/2008 | Heap | |
| 2008/0176706 A1 | 7/2008 | Wu | |
| 2008/0176709 A1 | 7/2008 | Wu | |
| 2008/0181280 A1 | 7/2008 | Wang | |
| 2008/0182696 A1 | 7/2008 | Sah | |
| 2008/0183372 A1 | 7/2008 | Snyder | |
| 2008/0234097 A1 | 9/2008 | Sah | |
| 2008/0236921 A1 | 10/2008 | Huseman | |
| 2008/0243346 A1 | 10/2008 | Huseman | |
| 2008/0249745 A1 | 10/2008 | Heap | |
| 2008/0262694 A1 | 10/2008 | Heap | |
| 2008/0262698 A1 | 10/2008 | Lahti | |
| 2008/0272717 A1 | 11/2008 | Gleason | |
| 2008/0275611 A1 | 11/2008 | Snyder | |
| 2008/0275624 A1 | 11/2008 | Snyder | |
| 2008/0275625 A1 | 11/2008 | Snyder | |
| 2008/0287255 A1 | 11/2008 | Snyder | |
| 2009/0069148 A1 | 3/2009 | Heap | |
| 2009/0069989 A1 | 3/2009 | Heap | |
| 2009/0070019 A1 | 3/2009 | Heap | |
| 2009/0082170 A1 | 3/2009 | Heap | |
| 2009/0088294 A1 | 4/2009 | West | |
| 2009/0105039 A1 | 4/2009 | Sah | |
| 2009/0105896 A1 | 4/2009 | Tamai | |
| 2009/0105898 A1 | 4/2009 | Wu | |
| 2009/0105914 A1 | 4/2009 | Buur | |
| 2009/0107745 A1 | 4/2009 | Buur | |
| 2009/0107755 A1 | 4/2009 | Kothari | |
| 2009/0108673 A1 | 4/2009 | Wang | |
| 2009/0111637 A1 | 4/2009 | Day | |
| 2009/0111640 A1 | 4/2009 | Buur | |
| 2009/0111642 A1 | 4/2009 | Sah | |
| 2009/0111643 A1 | 4/2009 | Sah | |
| 2009/0111644 A1 | 4/2009 | Kaminsky | |
| 2009/0111645 A1 | 4/2009 | Heap | |
| 2009/0112385 A1 | 4/2009 | Heap | |
| 2009/0112392 A1 | 4/2009 | Buur | |
| 2009/0112399 A1 | 4/2009 | Buur | |
| 2009/0112412 A1 | 4/2009 | Cawthorne | |
| 2009/0112416 A1 | 4/2009 | Heap | |
| 2009/0112417 A1 | 4/2009 | Kaminsky | |
| 2009/0112418 A1 | 4/2009 | Buur | |
| 2009/0112419 A1 | 4/2009 | Heap | |
| 2009/0112420 A1 | 4/2009 | Buur | |
| 2009/0112421 A1 | 4/2009 | Sah | |
| 2009/0112422 A1 | 4/2009 | Sah | |
| 2009/0112423 A1 | 4/2009 | Foster | |
| 2009/0112427 A1 | 4/2009 | Heap | |
| 2009/0112428 A1 | 4/2009 | Sah | |
| 2009/0112429 A1 | 4/2009 | Sah | |
| 2009/0112495 A1 | 4/2009 | Center | |
| 2009/0115349 A1 | 5/2009 | Heap | |
| 2009/0115350 A1 | 5/2009 | Heap | |
| 2009/0115351 A1 | 5/2009 | Heap | |
| 2009/0115352 A1 | 5/2009 | Heap | |
| 2009/0115353 A1 | 5/2009 | Heap | |
| 2009/0115354 A1 | 5/2009 | Heap | |
| 2009/0115365 A1 | 5/2009 | Heap | |
| 2009/0115373 A1 | 5/2009 | Kokotovich | |
| 2009/0115377 A1 | 5/2009 | Schwenke | |
| 2009/0115408 A1 | 5/2009 | West | |
| 2009/0115491 A1 | 5/2009 | Anwar | |
| 2009/0118074 A1 | 5/2009 | Zettel | |
| 2009/0118075 A1 | 5/2009 | Heap | |
| 2009/0118076 A1 | 5/2009 | Heap | |
| 2009/0118077 A1 | 5/2009 | Hsieh | |
| 2009/0118078 A1 | 5/2009 | Wilmanowicz | |
| 2009/0118079 A1 | 5/2009 | Heap | |
| 2009/0118080 A1 | 5/2009 | Heap | |
| 2009/0118081 A1 | 5/2009 | Heap | |
| 2009/0118082 A1 | 5/2009 | Heap | |
| 2009/0118083 A1 | 5/2009 | Kaminsky | |
| 2009/0118084 A1 | 5/2009 | Heap | |
| 2009/0118085 A1 | 5/2009 | Heap | |
| 2009/0118086 A1 | 5/2009 | Heap | |
| 2009/0118087 A1 | 5/2009 | Hsieh | |
| 2009/0118089 A1 | 5/2009 | Heap | |
| 2009/0118090 A1 | 5/2009 | Heap | |
| 2009/0118091 A1 | 5/2009 | Lahti | |
| 2009/0118093 A1 | 5/2009 | Heap | |
| 2009/0118094 A1 | 5/2009 | Hsieh | |
| 2009/0118877 A1 | 5/2009 | Center | |
| 2009/0118879 A1 | 5/2009 | Heap | |
| 2009/0118880 A1 | 5/2009 | Heap | |
| 2009/0118882 A1 | 5/2009 | Heap | |
| 2009/0118883 A1 | 5/2009 | Heap | |
| 2009/0118884 A1 | 5/2009 | Heap | |
| 2009/0118885 A1 | 5/2009 | Heap | |
| 2009/0118886 A1 | 5/2009 | Tamai | |
| 2009/0118887 A1 | 5/2009 | Minarcin | |
| 2009/0118888 A1 | 5/2009 | Minarcin | |
| 2009/0118901 A1 | 5/2009 | Cawthorne | |
| 2009/0118914 A1 | 5/2009 | Schwenke | |
| 2009/0118915 A1 | 5/2009 | Heap | |
| 2009/0118916 A1 | 5/2009 | Kothari | |
| 2009/0118917 A1 | 5/2009 | Sah | |
| 2009/0118918 A1 | 5/2009 | Heap | |
| 2009/0118919 A1 | 5/2009 | Heap | |
| 2009/0118920 A1 | 5/2009 | Heap | |
| 2009/0118921 A1 | 5/2009 | Heap | |

| | | |
|---|---|---|
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |
| 2009/0118933 A1 | 5/2009 | Heap |
| 2009/0118934 A1 | 5/2009 | Heap |
| 2009/0118935 A1 | 5/2009 | Heap |
| 2009/0118936 A1 | 5/2009 | Heap |
| 2009/0118937 A1 | 5/2009 | Heap |
| 2009/0118938 A1 | 5/2009 | Heap |
| 2009/0118939 A1 | 5/2009 | Heap |
| 2009/0118940 A1 | 5/2009 | Heap |
| 2009/0118941 A1 | 5/2009 | Heap |
| 2009/0118942 A1 | 5/2009 | Hsieh |
| 2009/0118943 A1 | 5/2009 | Heap |
| 2009/0118944 A1 | 5/2009 | Heap |
| 2009/0118945 A1 | 5/2009 | Heap |
| 2009/0118946 A1 | 5/2009 | Heap |
| 2009/0118947 A1 | 5/2009 | Heap |
| 2009/0118948 A1 | 5/2009 | Heap |
| 2009/0118949 A1 | 5/2009 | Heap |
| 2009/0118951 A1 | 5/2009 | Heap |
| 2009/0118952 A1 | 5/2009 | Heap |
| 2009/0118954 A1 | 5/2009 | Wu |
| 2009/0118957 A1 | 5/2009 | Heap |
| 2009/0118962 A1 | 5/2009 | Heap |
| 2009/0118963 A1 | 5/2009 | Heap |
| 2009/0118964 A1 | 5/2009 | Snyder |
| 2009/0118969 A1 | 5/2009 | Heap |
| 2009/0118971 A1 | 5/2009 | Heap |
| 2009/0118999 A1 | 5/2009 | Heap |
| 2009/0144002 A1 | 6/2009 | Zettel |

OTHER PUBLICATIONS

2006. Syed, Ying, Smith. "Rule-Based Fuzzy Gain-Scheduling PI Controller to Improve Engine Speed and Power Behavior in a Power-split Hybrid Electric Vehicle". 1-4244-0363-4/06/$20.00 © 2006 IEEE.*

2006. Signh. "Computer Aided Design of Permanent Magnet Brushless DC Motor for Hybrid Electric Vehicle Application". 0-7803-9525-5/06/$2 © 2006 IEEE.*

* cited by examiner

METHOD AND APPARATUS TO DETERMINE A PREFERRED OUTPUT TORQUE FOR OPERATING A HYBRID TRANSMISSION IN A CONTINUOUSLY VARIABLE MODE

CROSS REFERENCE TO RELATED APPLICATIONS

This application claims the benefit of U.S. Provisional Application No. 60/985,382, filed on Nov. 5, 2007 which is hereby incorporated herein by reference.

TECHNICAL FIELD

This disclosure pertains to control systems for hybrid powertrain systems.

BACKGROUND

The statements in this section merely provide background information related to the present disclosure and may not constitute prior art.

Known hybrid powertrain architectures include torque-generative devices, including internal combustion engines and electric machines, which transfer torque through a transmission device to an output member. One exemplary hybrid powertrain includes a two-mode, compound-split, electro-mechanical transmission which utilizes an input member for receiving tractive torque from a prime mover power source, preferably an internal combustion engine, and an output member. The output member can be operatively connected to a driveline for a motor vehicle for transferring tractive torque thereto. Electric machines, operative as motors or generators, generate a torque input to the transmission, independently of a torque input from the internal combustion engine. The electric machines may transform vehicle kinetic energy, transferred through the vehicle driveline, to electrical energy that is storable in an electrical energy storage device. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

A hybrid transmission includes a torque machine and an energy storage device connected thereto. The hybrid transmission is operative to transfer power between an input member and an output member and the torque machine in a continuously variable operating range state. A method for controlling the hybrid transmission includes determining a preferred output torque, determining a relationship between power from the energy storage device and an output torque of the transmission, determining power constraints from the energy storage device, determining motor torque constraints for the torque machine, determining linear torque constraints to the output torque based upon the motor torque constraints for the torque machine, determining quadratic output torque constraints based upon the power constraints from the energy storage device and the relationship between the power from the energy storage device and the output torque of the transmission device, and determining an output torque to the output member responsive to the preferred output torque and achievable based upon the linear output torque constraints and the quadratic output torque constraints.

BRIEF DESCRIPTION OF THE DRAWINGS

One or more embodiments will now be described, by way of example, with reference to the accompanying drawings, in which.

DETAILED DESCRIPTION

Figure 1:
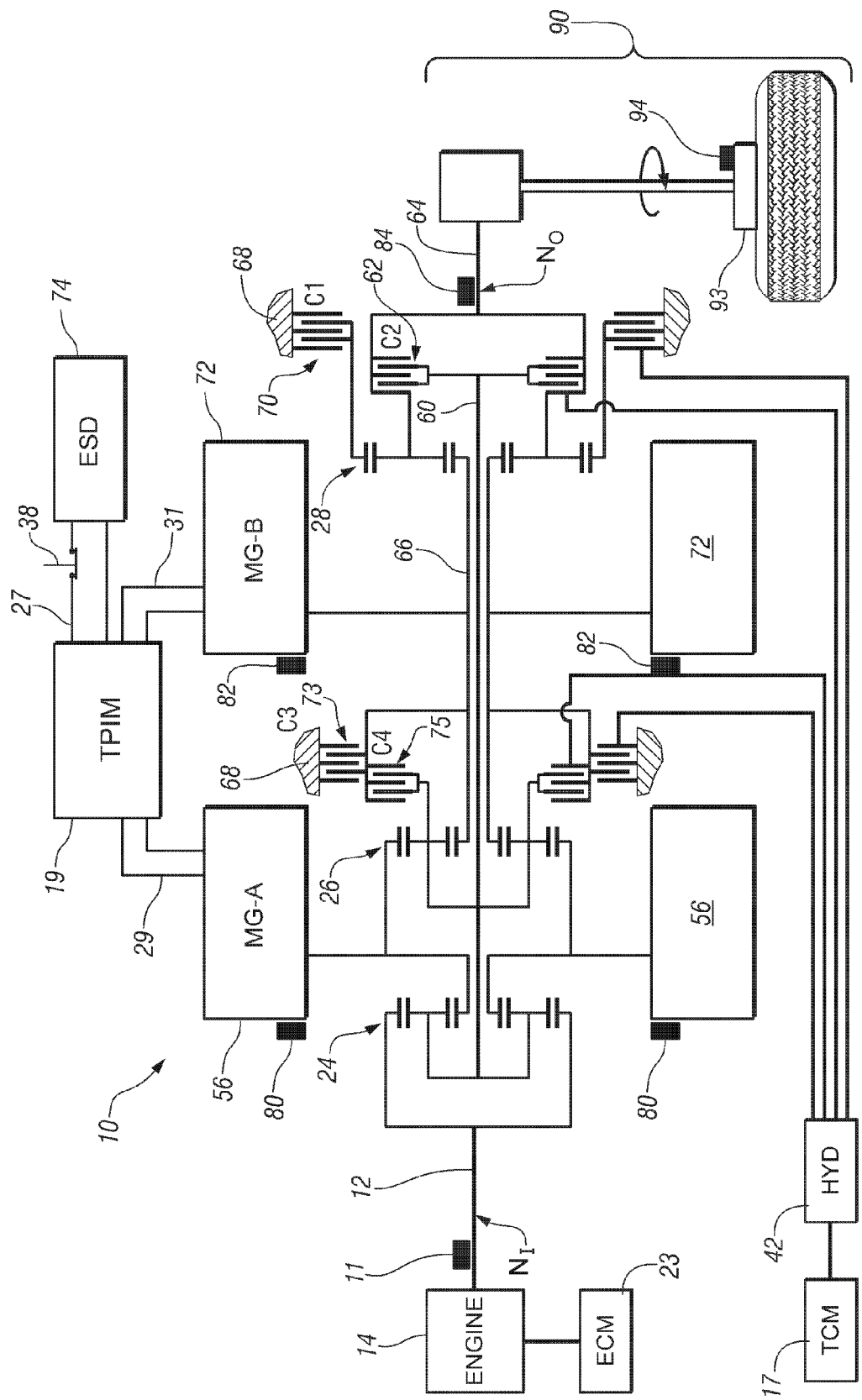
FIG. 1 is a schematic diagram of an exemplary hybrid powertrain, in accordance with the present disclosure.
Figure 2:
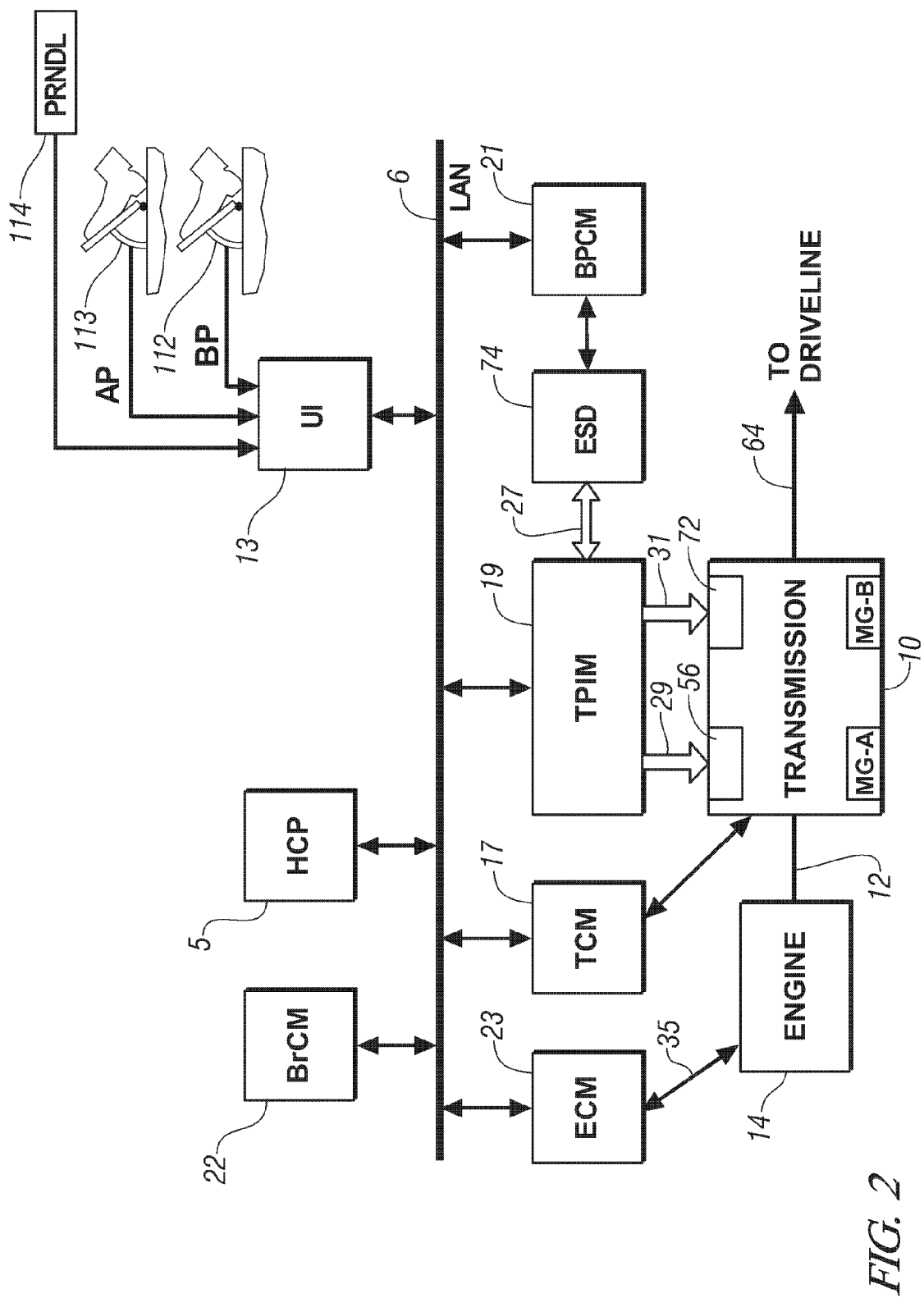
FIG. 2 is a schematic diagram of an exemplary architecture for a control system and hybrid powertrain, in accordance with the present disclosure.

Referring now to the drawings, wherein the showings are for the purpose of illustrating certain exemplary embodiments only and not for the purpose of limiting the same, FIGS. 1 and 2 depict an exemplary hybrid powertrain. The exemplary hybrid powertrain in accordance with the present disclosure is depicted in FIG. 1, comprising a two-mode, compound-split, electro-mechanical hybrid transmission 10 operatively connected to an engine 14 and torque machines comprising first and second electric machines ('MG-A') 56 and ('MG-B') 72. The engine 14 and first and second electric machines 56 and 72 each generate mechanical power which can be transferred to the transmission 10. The engine 14, transmission 10 and the torque machines comprising the first and second electric machines in this embodiment comprise torque actuators. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed $N_I$ and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit ('HYD') 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torque commands $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the motor torque commands and control inverter states therefrom for providing motor drive or regenerative functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UI') 13 is operatively connected to a plurality of devices through which a vehicle operator controls or directs operation of the electro-mechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torque commands $T_A$ and $T_B$ for the first and second electric machines 56 and 72.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic control circuit 42. Inputs from the TCM 17 to the HCP 5 include estimated clutch torques for each of the clutches, i.e., C1 70, C2 62, C3 73, and C4 75, and rotational output speed, $N_O$, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic control circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and SPI buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several states that can be described in terms of engine states comprising one of an engine-on state ('ON') and an engine-off state ('OFF'), and transmission operating range states comprising a plurality of fixed gears and continuously variable operating modes, described with reference to Table 1, below.

TABLE 1

| Description | Engine State | Transmission Operating Range State | Applied Clutches | |
|---|---|---|---|---|
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque-generative devices comprising the engine 14 and the first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, the output torque commanded from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The engine state and the transmission operating range state are determined based upon operating characteristics of the hybrid powertrain. This includes the operator torque request communicated through the accelerator pedal 113 and brake pedal 112 to the user interface 13 as previously described. The transmission operating range state and the engine state may be predicated on a hybrid powertrain torque demand caused by a command to operate the first and second electric machines 56 and 72 in an electrical energy generating mode or in a torque generating mode. The transmission operating range state and the engine state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 at output member 64 that is required to meet the operator torque request while meeting other powertrain operating demands, e.g., charging the ESD 74. As should be apparent from the description above, the ESD 74 and the first and second electric machines 56 and 72 are electrically-operatively coupled for power flow therebetween. Furthermore, the engine 14, the first and second electric machines 56 and 72, and the electro-mechanical transmission 10 are mechanically-operatively coupled to transfer power therebetween to generate a power flow to the output member 64.

Figure 3:
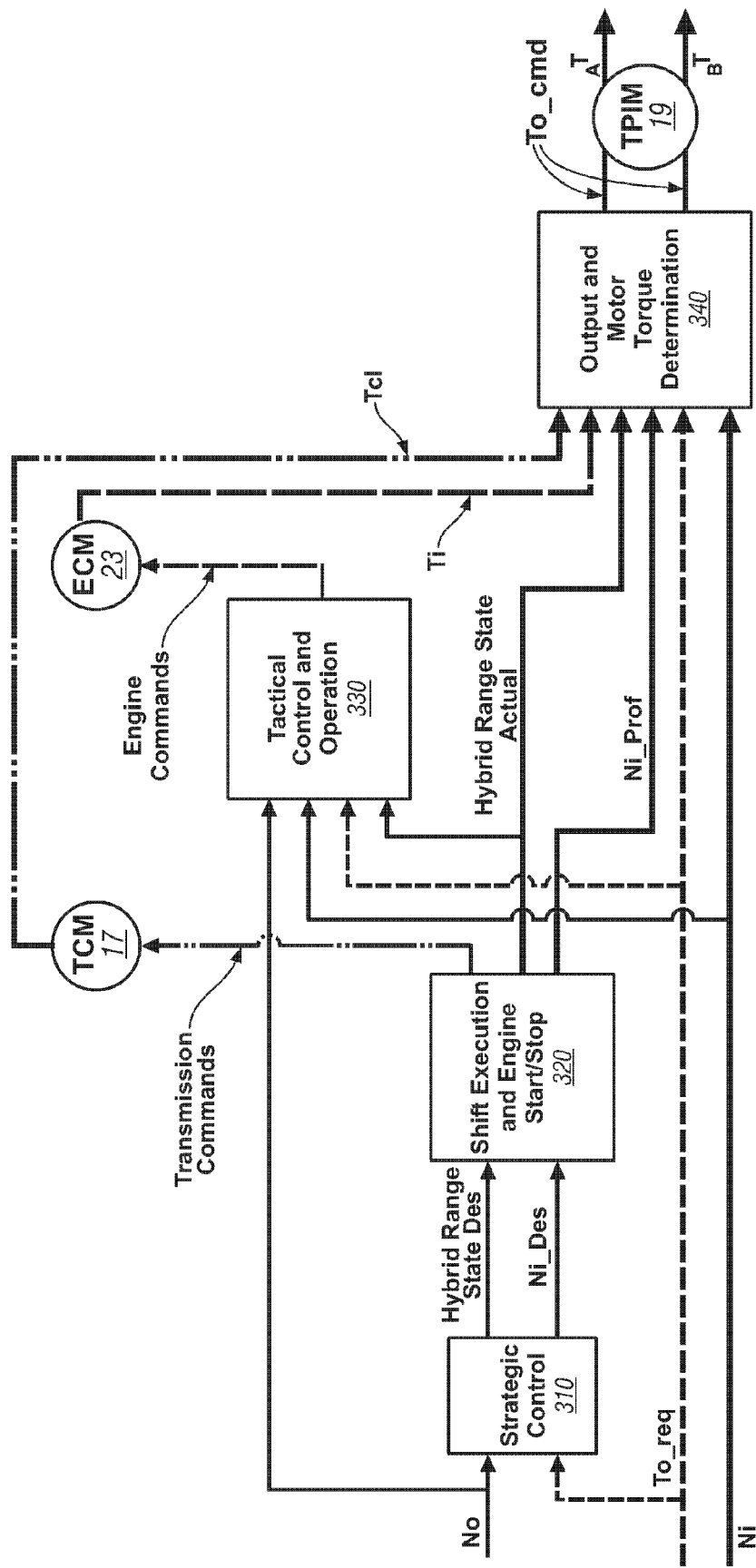
FIG. 3 is a schematic flow diagram of a control system architecture for controlling and managing torque in a hybrid powertrain system, in accordance with the present disclosure.

FIG. 3 shows a control system architecture for controlling and managing signal flow in a hybrid powertrain system having multiple torque generative devices, described hereinbelow with reference to the hybrid powertrain system of FIGS. 1 and 2, and residing in the aforementioned control modules in the form of executable algorithms and calibrations. The control system architecture is applicable to alternative hybrid powertrain systems having multiple torque generative devices, including, e.g., a hybrid powertrain system having an engine and a single electric machine, a hybrid powertrain system having an engine and multiple electric machines. Alternatively, the hybrid powertrain system can utilize non-electric torque machines and energy storage systems, e.g., hydraulic-mechanical hybrid transmissions using hydraulically powered torque machines (not shown).

In operation, the operator inputs to the accelerator pedal 113 and the brake pedal 112 are monitored to determine the operator torque request ('To_req'). Operation of the engine 14 and the transmission 10 are monitored to determine the input speed ('Ni') and the output speed ('No'). A strategic optimization control scheme ('Strategic Control') 310 determines a preferred input speed ('Ni_Des') and a preferred engine state and transmission operating range state ('Hybrid Range State Des') based upon the output speed and the operator torque request, and optimized based upon other operating parameters of the hybrid powertrain, including battery power limits and response limits of the engine 14, the transmission 10, and the first and second electric machines 56 and 72. The strategic optimization control scheme 310 is preferably executed by the HCP 5 during each 100 ms loop cycle and each 25 ms loop cycle. The desired operating range state for the transmission 10 and the desired input speed from the engine 14 to the transmission 10 are inputs to the shift execution and engine start/stop control scheme 320.

The shift execution and engine start/stop control scheme 320 commands changes in the transmission operation ('Transmission Commands') including changing the operating range state based upon the inputs and operation of the powertrain system. This includes commanding execution of a change in the transmission operating range state if the preferred operating range state is different from the present operating range state by commanding changes in application of one or more of the clutches C1 70, C2 62, C3 73, and C4 75 and other transmission commands. The present operating range state ('Hybrid Range State Actual') and an input speed profile ('Ni_Prof') can be determined. The input speed profile is an estimate of an upcoming input speed and preferably comprises a scalar parametric value that is a targeted input speed for the forthcoming loop cycle. The engine operating commands and the operator torque request are based upon the input speed profile during a transition in the operating range state of the transmission. A clutch torque ('Tcl') for each clutch is estimated in the TCM 17, including the presently applied clutches and the non-applied clutches.

A tactical control scheme ('Tactical Control and Operation') 330 is repeatedly executed during one of the control loop cycles to determine engine commands ('Engine Commands') for operating the engine, including a preferred input torque from the engine 14 to the transmission 10 based upon the output speed, the input speed, and the operator torque request and the present operating range state for the transmission. The engine commands also include engine states including one of an all-cylinder operating state and a cylinder deactivation operating state wherein a portion of the engine cylinders are deactivated and unfueled, and engine states including one of a fueled state and a fuel cutoff state. A present engine input torque ('Ti') reacting with the input member 12 is determined in the ECM 23.

An output and motor torque determination scheme ('Output and Motor Torque Determination') 340 is executed to determine the preferred output torque from the powertrain ('To_cmd'). This includes determining motor torque commands ('$T_A$', '$T_B$') to transfer a net output torque to the output member 64 of the transmission 10 that meets the operator torque request, by controlling the first and second electric machines 56 and 72 in this embodiment. The immediate accelerator output torque request, the immediate brake output torque request, the present input torque from the engine 14 and the estimated applied clutch torque(s), the present operating range state of the transmission 10, the input speed, the input speed profile, and the axle torque response type are inputs. The output and motor torque determination scheme 340 executes to determine the motor torque commands during each iteration of one of the loop cycles. The output and motor torque determination scheme 340 includes algorithmic code which is regularly executed during the 6.25 ms and 12.5 ms loop cycles to determine the preferred motor torque commands.

The hybrid powertrain is controlled to transfer the output torque to the output member 64 and thence to the driveline 90 to generate tractive torque at wheel(s) 93 to forwardly propel the vehicle in response to the operator input to the accelerator pedal 113 when the operator selected position of the transmission gear selector 114 commands operation of the vehicle in the forward direction. Similarly, the hybrid powertrain is controlled to transfer the output torque to the output member 64 and thence to the driveline 90 to generate tractive torque at wheel(s) 93 to propel the vehicle in a reverse direction in response to the operator input to the accelerator pedal 113 when the operator selected position of the transmission gear selector 114 commands operation of the vehicle in the reverse direction. Preferably, propelling the vehicle results in vehicle acceleration so long as the output torque is sufficient to overcome external loads on the vehicle, e.g., due to road grade, aerodynamic loads, and other loads.

Operation of the engine 14 and transmission 10 is constrained by power, torque and rotational speed limits of the engine 14, the first and second electric machines 56 and 72, the ESD 74 and the clutches C1 70, C2 62, C3 73, and C4 75. The operating constraints on the engine 14 and transmission 10 can be translated to a set of system constraint equations executed as one or more algorithms in one of the control modules, e.g., the HCP 5.

Referring again to FIG. 1, in overall operation, the transmission 10 operates in one of the operating range states through selective actuation of the torque-transfer clutches in one embodiment. Torque constraints for each of the engine 14 and the first and second electric machines 56 and 72 and speed constraints for the engine 14 and the first and second electric machines 56 and 72 are determined. Battery power constraints for the ESD 74, i.e., the available battery power is determined, and applied to further limit operation of the first and second electric machines 56 and 72. The preferred operating region for the powertrain is determined using the system constraint equations that are based upon the battery power constraints, the motor torque constraints, the speed constraints, and clutch reactive torque constraints. The preferred operating region comprises a range of permissible operating torques or speeds for the engine 14 and the first and second electric machines 56 and 72. By deriving and simultaneously solving dynamics equations of the transmission 10, the torque limit, in this embodiment the output torque $T_O$, can be determined using linear equations including: the following.

$$T_{M1} = T_A\text{to}T_{M1} * T_A + T_B\text{to}T_{M1} * T_B + \text{Misc}\_T_{M1}; \qquad [1]$$

$$T_{M2} = T_A\text{to}T_{M2} * T_A + T_B\text{to}T_{M2} * T_B + \text{Misc}\_T_{M2}; \qquad [2]$$

$$T_{M3} = T_A\text{to}T_{M3} * T_A + T_B\text{to}T_{M3} * T_B + \text{Misc}\_T_{M3} \qquad [3]$$

In one embodiment, the torque values include: $T_{M1}$ representing the output torque $T_O$ at output member 64, $T_{M2}$ representing the input torque $T_I$ at input shaft 12, and $T_{M3}$ representing the clutch torque(s) for the applied torque-transfer clutches C1 70, C2 62, C3 73, C4 75 of the transmission 10; The factors $T_A\text{to}T_{M1}$, $T_A\text{to}T_{M2}$, and $T_A\text{to}T_{M3}$ are contributing factors of $T_A$ to $T_{M1}$, $T_{M2}$, $T_{M3}$, respectively. The factors $T_B\text{to}T_{M1}$, $T_B\text{to}T_{M2}$, and $T_B\text{to}T_{M3}$ are contributing factors of $T_B$ to $T_{M1}$, $T_{M2}$, $T_{M3}$, respectively. The factors $\text{Misc}\_T_{M1}$, $\text{Misc}\_T_{M2}$, and $\text{Misc}\_T_{M3}$ are constants which contribute to $T_{M1}$, $T_{M2}$, $T_{M3}$ by non $T_A$, $T_B$, $T_{M1}$, $T_{M2}$ and $T_{M3}$ parameters such as time-rate changes in speed of the input member 12, time-rate changes in speed of the output member 64, and slip speed(s) of the torque-transfer clutches C1 70, C2 62, C3 73, C4 75 depending on the applications, and are described herein. The torque parameters $T_A$ and $T_B$ are the motor torques from the first and second electric machines 56 and 72. The torque parameters $T_{M1}$, $T_{M2}$, $T_{M3}$ can be any three independent parameters, depending upon the operating range state and the application.

The engine 14 and transmission 10 and the first and second electric machines 56 and 72 have speed constraints, torque constraints, and battery power constraints due to mechanical and system limitations. The speed constraints can include engine speed constraints of $N_I = 0$ (engine off state), and $N_I$ ranging from 600 rpm (idle) to 6000 rpm for the engine 14. Exemplary speed constraints for the first and second electric machines 56 and 72 for this embodiment can be:

$$-10{,}500 \text{ rpm} \leq N_A \leq +10{,}500 \text{ rpm, and,}$$

$$-10{,}500 \text{ rpm} \leq N_B \leq +10{,}500 \text{ rpm,}$$

and can vary based upon operating conditions. The torque constraints include motor torque constraints for the first and second electric machines 56 and 72 including $T_{A\_MIN} \leq T_A \leq T_{A\_MAX}$ and $T_{B\_MIN} \leq T_B \leq T_{B\_MAX}$. The motor torque constraints $T_{A\_MAX}$ and $T_{A\_MIN}$ comprise torque limits for the first electric machine 56 when working as a torque motor and an electric generator at positive rotational speeds, respectively. The motor torque constraints $T_{B\_MAX}$ and $T_{B\_MIN}$ comprise torque limits for the second electric machine 72 when working as a torque motor and an electric generator at positive rotational speeds, respectively. The maximum and minimum motor torques $T_{A\_MAX}$, $T_{A\_MIN}$, $T_{B\_MAX}$, and $T_{B\_MIN}$ are preferably obtained from data sets stored in tabular format within one of the memory devices of one of the control modules. Such data sets can be empirically derived from conventional dynamometer testing of the combined motor and power electronics, e.g., the TPIM 19, at various temperature and voltage conditions. Battery power constraints comprise the available battery power within the range of $P_{BAT\_MIN}$ to $P_{BAT\_MAX}$, wherein $P_{BAT\_MIN}$ is maximum allowable battery charging power and $P_{BAT\_MAX}$ is the maximum allowable battery discharging power. The operation of the system described hereinbelow is determined at known engine input speeds and torques, and thus the derivation of the equations is based upon torque transfer within the transmission 14.

An operating range, comprising a torque output range is determinable based upon the battery power constraints of the ESD 74. Calculation of battery power usage, $P_{BAT}$ is as follows:

$$P_{BAT} = P_{A,ELEC} + P_{B,ELEC} + P_{DC\_LOAD} \qquad [4]$$

wherein $P_{A,ELEC}$ comprises electrical power from the first electric machine 56, $P_{B,ELEC}$ comprises electrical power from the second electric machine 72, and $P_{DC\_LOAD}$ comprises known DC load, including accessory loads.

Substituting equations for $P_{A,ELEC}$ and $P_{B,ELEC}$, yields the following equation:

$$P_{BAT}=(P_{A,MECH}+P_{A,LOSS})+(P_{B,MECH}+P_{B,LOSS})+P_{DC\,LOAD} \quad [5]$$

wherein $P_{A,MECH}$ comprises mechanical power from the first electric machine 56, $P_{A,LOSS}$ comprises power losses from the first electric machine 56, $P_{B,MECH}$ comprises mechanical power from the second electric machine 72, and $P_{B,LOSS}$ comprises power losses from the second electric machine 72.

Eq. 5 can be restated as Eq. 6, below, wherein speeds, $N_A$ and $N_B$, and torques, $T_A$ and $T_B$, are substituted for powers $P_A$ and $P_B$. This includes an assumption that motor and inverter losses can be mathematically modeled as a quadratic equation based upon torque, as follows:

$$P_{BAT} = (N_A T_A + (a_1(N_A)T_A^2 + a_2(N_A)T_A + a_3(N_A))) + \quad [6]$$
$$(N_B T_B + (B_1(N_B)T_B^2 + B_2(N_B)T_B + B_3(N_B))) + \text{PDC}_{\_LOAD}$$

wherein $N_A$, $N_B$ comprise motor speeds for the first and second electric machines 56 and 72, $T_A$, $T_B$ comprise the motor torques for the first and second electric machines 56 and 72, and a1, a2, a3, b1, b2, b3 each comprise quadratic coefficients which are a function of respective motor speeds, $N_A$, $N_B$.

This can be restated as follows:

$$P_{BAT} = a_1^* T_A^2 + (N_A + a_2)*T_A + \quad [7]$$
$$b_1 * T_B^2 + (N_B + b_2) * T_B + a3 + b3 + P_{DC\_LOAD}$$

This reduces to:

$$P_{BAT} = a_1[T_A^2 + T_A(N_A + a_2)/a_1 + ((N_A + a_2)/(2*a_1))^2] + \quad [8]$$
$$b_1[T_B^2 + T_B(N_B + b_2)/b_1 + ((N_B + b_2)/(2*b_1))^2] + a3 +$$
$$b3 + P_{DC\_LOAD} - (N_A + a_2)^2/(4*a_1) - (N_B + b_2)^2/(4*b_1)$$

This reduces to:

$$P_{BAT} = a_1[T_A + (N_A + a_2)/(2*a_1)]^2 + b_1[T_B + (N_B + b_2)/(2*b_1)]^2 + \quad [9]$$
$$a_3 + b_3 + P_{DC\_LOAD} - (N_A + a_2)^2/(4*a_1) - (N_B + b_2)^2/(4*b_1)$$

This reduces to:

$$P_{BAT} = [SQRT(a_1)*T_A + (N_A + a_2)/(2*SQRT(a_1))]^2 + \quad [10]$$
$$[SQRT(b_1)*T_B + (N_B + b_2)/(2*SQRT(b_1))]^2 + a_3 + b_3 +$$
$$P_{DC\_LOAD} - (N_A + a_2)^2/(4*a_1) - (N_B + b_2)^2/(4*b_1)$$

This reduces to:

$$P_{BAT}=(A_1*T_A+A_2)^2+(B_1*T_B+B_2)^2+C \quad [11]$$

wherein $A_1$=SQRT($a_1$),
$B_1$=SQRT($b_1$),
$A_2$=($N_A$+$a_2$)/(2*SQRT($a_1$)),
$B_2$=($N_B$+$b_2$)/(2*SQRT($b_1$)), and
$C$=$a_3$+$b_3$+$P_{DC\_LOAD}$−($N_A$+$a_2$)²/(4*$a_1$)−($N_B$+$b_2$)²/(4*$b_1$).

This can be restated as:

$$P_{BAT}=P_{A\_ELEC}+P_{B\_ELEC}+P_{DC\_LOAD} \quad [11A]$$

wherein $P_{A\_ELEC}=(A_1*T_A+A_2)^2+C_A$, and
$P_{B\_ELEC}=(B_1*T_B+B_2)^2+C_B$
wherein $C_A$=$a_3$−($N_A$+$a_2$)²/(4*$a_1$) and
$C_B$=$b_3$−($N_B$+$b_2$)²/(4*$b_1$), and
$C$=$C_A$+$C_B$+$P_{DC\_LOAD}$ The motor torques $T_A$ and $T_B$ can be transformed to the $T_X$ and $T_Y$ as follows:

$$\begin{bmatrix} T_X \\ T_Y \end{bmatrix} = \begin{bmatrix} A_1 & 0 \\ 0 & B_1 \end{bmatrix} * \begin{bmatrix} T_A \\ T_B \end{bmatrix} + \begin{bmatrix} A_2 \\ B_2 \end{bmatrix} \quad [12]$$

wherein $T_X$ is the transformation of $T_A$,
$T_Y$ is the transformation of $T_B$, and
$A_1$, $A_2$, $B_1$, $B_2$ comprise application-specific scalar values.

Eq. 11 further reduces to the following.

$$P_{BAT}=(T_X^2+T_Y^2)+C \quad [13]$$

$$P_{BAT}=R^2+C \quad [14]$$

Eq. 12 specifies the transformation of motor torque, $T_A$ to $T_X$ and the transformation of motor torque $T_B$ to $T_Y$. Thus, a new coordinate system referred to as $T_X/T_Y$ space is defined, and Eq. 13 comprises battery power $P_{BAT}$ transformed into $T_X/T_Y$ space. Therefore, the available battery power between maximum and minimum battery powers $P_{BAT\_MAX}$ and $P_{BAT\_MIN}$ can be calculated and graphed as radii ('$R_{MAX}$' and '$R_{MIN}$') with a center at locus (0, 0) in the $T_X/T_Y$ space, and designated by the letter K, wherein:

$$R_{MIN}=SQRT(P_{BAT\_MIN}-C)$$

$$R_{MAX}=SQRT(P_{BAT\_MAX}-C)$$

The minimum and maximum battery powers, $P_{BAT\_MIN}$ and $P_{BAT\_MAX}$, are preferably correlated to various conditions, e.g. state of charge, temperature, voltage and usage (amp-hour/hour). The parameter C, above, is defined as the absolute minimum possible battery power at given motor speeds, $N_A$, $N_B$, ignoring motor torque limits. Physically, when $T_A$=0 and $T_B$=0 the mechanical output power from the first and second electric machines 56 and 72 is zero. Physically $T_X$=0 and $T_Y$=0 corresponds to a maximum charging power condition for the ESD 74. The positive sign ('+') is defined as discharging power from the ESD 74, and the negative sign ('−') is defined as charging power into the ESD 74. $R_{MAX}$ defines a maximum battery power typically a discharging power, and $R_{MIN}$ defines a minimum battery power, typically a charging power.

The forgoing transformations to the $T_X/T_Y$ space, designated by a second coordinate system K, are shown in FIG. 6, with representations of the battery power constraints as concentric circles having radii of $R_{Min}$ and $R_{Max}$ and linear representations of the motor torque constraints ('$T_{A\_MIN}$', '$T_{A\_MAX}$', '$T_{B\_MIN}$', and '$T_{B\_MAX}$') circumscribing an allowable operating region. Analytically, the transformed vector [$T_X/T_Y$] determined in Eq. 12 is solved simultaneously with the vector defined in Eq. 13 to identify a range of allowable torques in the $T_X/T_Y$ space which are made up of motor torques $T_A$ and $T_B$ constrained by the minimum and maximum battery powers $P_{BAT\_MIN}$ to $P_{BAT\_MAX}$. The range of allowable motor torques in the $T_X/T_Y$ space is shown with reference to FIG. 4, wherein points A, B, C, D, and E represent the bounds, and lines and radii are defined. A first coordinate system L depicts $T_A/T_B$ space in relationship to the $T_X/T_Y$ space.

Figure 5A:
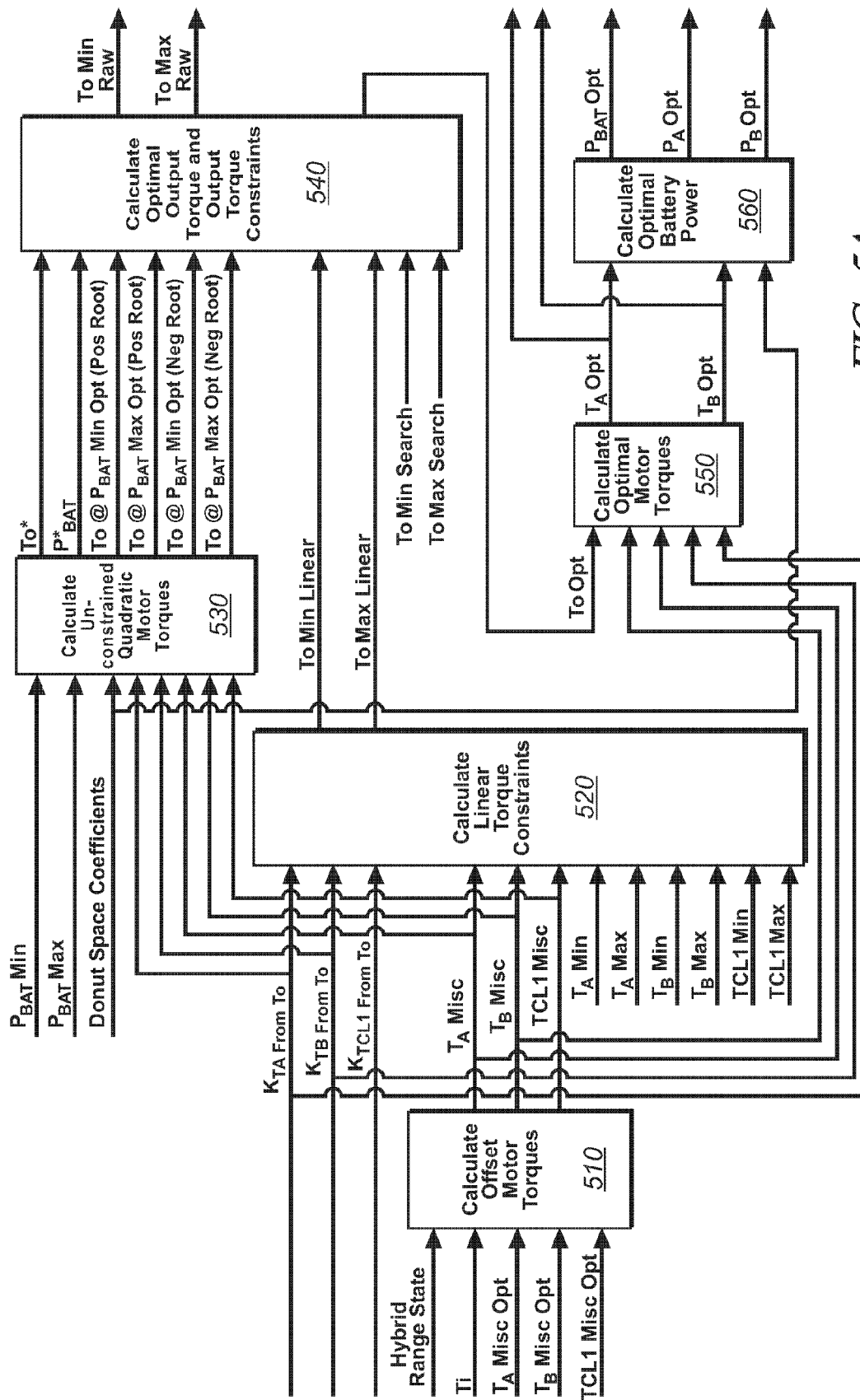
FIGS. 5A and 5B are schematic flow diagrams of a control system architecture for controlling and managing torque in a hybrid powertrain system, in accordance with the present disclosure.
Figure 5B:
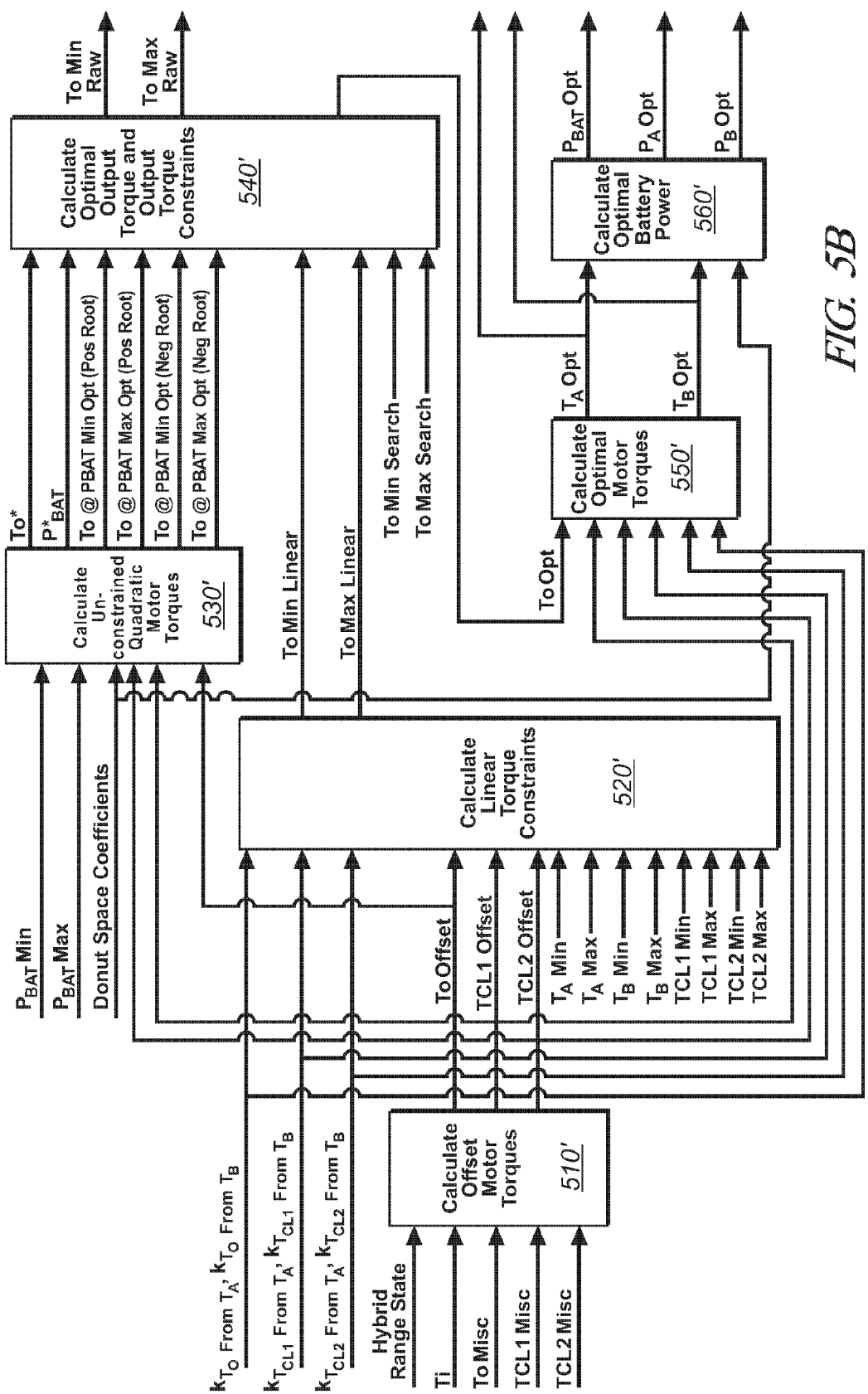

FIGS. 5A and 5B schematically show a control scheme and FIGS. 6A and 6B graphically shows operation of the control scheme of FIGS. 5A and 5B for determining a preferred output torque from a powertrain system having multiple torque-generative devices, described hereinbelow with reference to the powertrain system depicted in FIGS. 1 and 2, residing in the aforementioned control modules in the form of executable algorithms and calibrations, and preferably used in the control system architecture of FIG. 3.

FIG. 5A depicts operation in one of the continuously variable mode operating range states. During ongoing operation in one of the mode operating range states, the operator inputs to the accelerator pedal 113 and the brake pedal 112 are monitored to determine the operator torque request. The system calculates offset motor torques based upon inputs including the operating range state of the transmission 10, the input torque and terms based upon system inertias, system damping, and clutch slippage ('$T_A$ Misc Opt', '$T_B$ Misc Opt', 'TCL1 Misc Opt') described hereinbelow with reference to Eqs. 17, 18, and 19 (510). The term 'CL1' designates a first applied clutch, i.e., one of clutches C1 70 and C2 62 in the embodiment described, and 'TCL1' is the torque transferred across CL1. The offset motor torques and clutch torque are inputs to calculate linear torque constraints to the output torque (520) and calculate an unconstrained quadratic solution to the output torque (530).

The unconstrained quadratic solution to the output torque (530) is calculated using the power limits for the ESD 74, i.e., the available battery power $P_{BAT\_MIN}$ to $P_{BAT\_MAX}$, the offset motor torque constraints, motor torque characteristics defined in terms of coefficients for converting between mechanical torque and electric power in terms of efficiency and power loss in the first and second electric machines 56 and 72 ('Donut Space Coefficients'), and other scalar terms related to the torque outputs from the first and second electric machines 56 and 72 and the reactive torque of the applied clutch ('$K_{TA\,from\,To}$', '$K_{TB\,from\,To}$', '$K_{TCL1\,from\,To}$'). The aforementioned inputs are used to calculate a first constraint on the output torque from the transmission 10, comprising the unconstrained quadratic solution, which includes an optimized output torque ('To*') and an optimized battery power ('$P^*_{BAT}$') for operating the system without concern for other constraints on the system. The power for the energy storage device 74 can be represented mathematically as a function of the transmission output torque To as shown in Eq. 15.

$$P_{BAT}(T_O) = (a_1^2 + b_1^2)(T_O - T_O^*)^2 + P_{BAT}^* \qquad [15]$$

wherein $a_1$ and $b_1$ represent scalar values determined for the specific application. Eq. 15 can be solved for the output torque, as shown in Eq. 16:

$$T_O(P_{BAT}) = T_O^* \pm \sqrt{\frac{P_{BAT} - P_{BAT}^*}{a_1^2 + b_1^2}} \qquad [16]$$

Figure 6A:
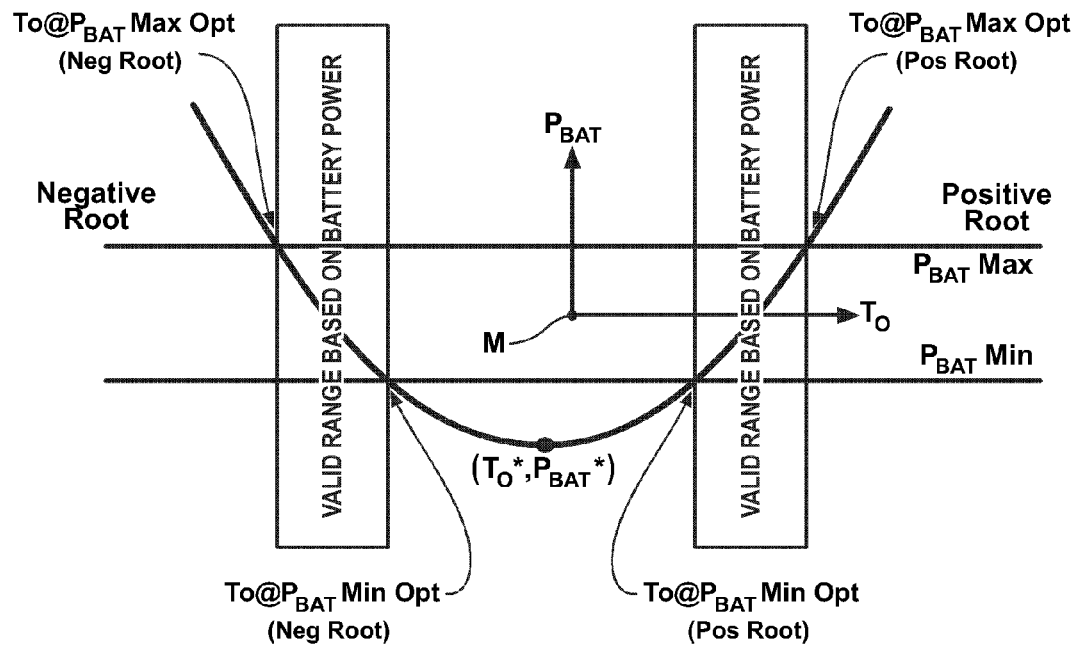
FIGS. 6A and 6B are graphical depictions, in accordance with the present disclosure.

For the available battery power range $P_{BAT\_MIN}$ to $P_{BAT\_MAX}$, four distinct output torques can be determined from Eq. 16, including maximum and minimum quadratic output torque constraints for the positive root case ('To@$P_{BAT}$ Max Opt (Pos Root)' and 'To@$P_{BAT}$ Min Opt (Pos Root)'), and minimum and maximum quadratic output torque constraints for the negative root case ('To@$P_{BAT}$ Max Opt (Neg Root)' and 'To@$P_{BAT}$ Min Opt (Neg Root)'), plotted with reference to FIG. 6A. FIG. 6A shows valid, i.e., achievable ranges of output torque determined based the battery power constraints.

The linear torque constraints to the output torque, i.e., minimum and maximum linear output torques ('To Min Linear', 'To Max Linear') (520) are determined based upon the offset motor torques, the scalar terms related to the motor torques from the first and second electric machines 56 and 72 and the reactive torque of the applied clutch ('$K_{TA\,from\,To}$', '$K_{TB\,from\,To}$', '$K_{TCL1\,from\,To}$'), the motor torque constraints comprising minimum and maximum motor torque limits of the first and second electric machines 56 and 72. Minimum and maximum clutch reactive torques for applied clutch(es) CL1 (and CL2) are graphed relative to the motor torque constraints, for first and, as shown (where necessary) second applied clutches ('$T_{CL1}$ MIN', '$T_{CL1}$ MAX') and ('$T_{CL2}$ MIN', '$T_{CL2}$ MAX').

Figure 6B:
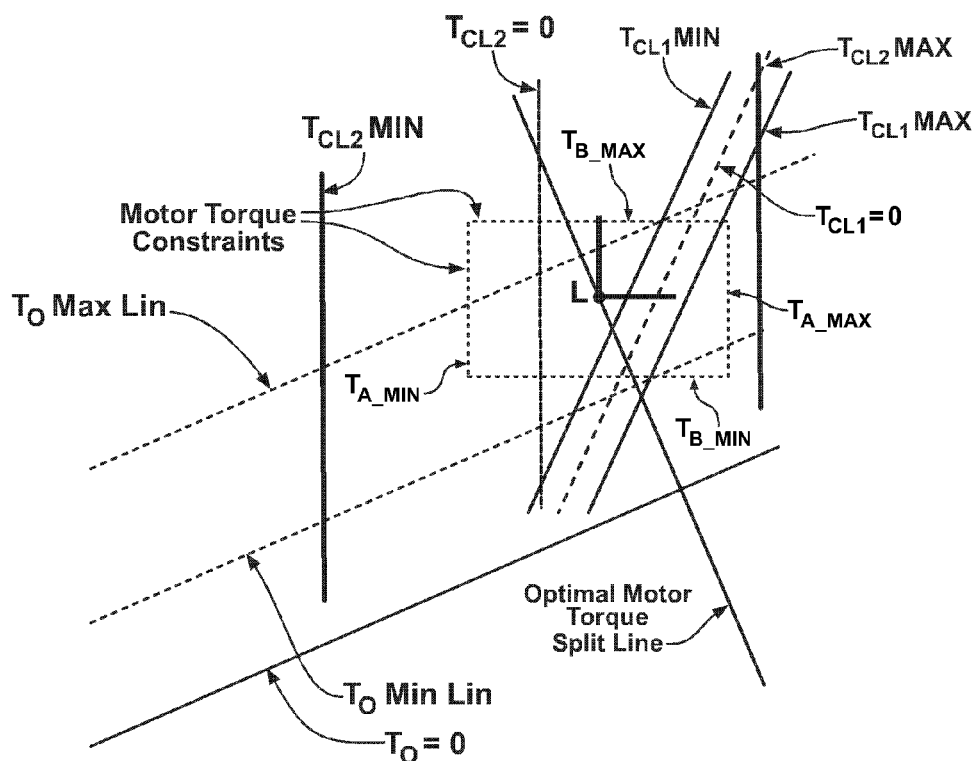

FIG. 6B graphically shows determining minimum and maximum linear output torques ('To Min Lin', 'To Max Lin') based upon the offset motor torques, the minimum and maximum achievable motor torques for the first and second electric machines 56 and 72 and the minimum and maximum clutch reactive torque(s) for the applied clutch(es) (520). The minimum and maximum linear output torques are the minimum and maximum output torques that meet the motor torque constraints and also meets the applied clutch torque constraints. An operating region for the exemplary powertrain system is graphically shown, including the motor torque constraints ('Motor Torque Constraints') comprising maximum and minimum achievable motor torques ('$T_{A\_MAX}$', '$T_{A\_MIN}$', '$T_{B\_MAX}$' and '$T_{B\_MIN}$') for the first and second electric machines 56 and 72 in one embodiment. Minimum and maximum clutch reactive torques for applied clutch(es) CL1 and CL2 are graphed relative to the motor torque constraints, for first and, as shown (where necessary), second applied clutches ('$T_{CL1}$ MIN', '$T_{CL1}$ MAX') and ('$T_{CL2}$ MIN', '$T_{CL2}$ MAX'). Minimum and maximum linear output torques ('To Min Lin', 'To Max Lin') can be determined based upon the offset motor torques, the minimum and maximum achievable motor torques for the first and second electric machines 56 and 72 and the minimum and maximum clutch reactive torques for the applied clutch(es). The minimum and maximum linear output torques are the minimum and maximum output torques that meet the motor torque constraints and also meet the applied clutch torque constraints. In the example shown, the minimum and maximum clutch reactive torques for the second applied clutch CL2 are less restrictive and outside the motor torque constraints, and thus do not constrain the output torque. Operation is bounded by the region defined by the minimum and maximum clutch reactive torques for the first applied clutch CL1 and the maximum and minimum motor torque constraints for the second electric machine 72, i.e., $T_{B\_MAX}$ and $T_{B\_MIN}$. The maximum linear output torque is the maximum output torque in this region, i.e., the output torque at the intersection between the maximum motor torque constraint for the second electric machine 72 and minimum clutch reactive torque for the first applied clutch ('$T_{CL1}$ Min'). The minimum linear output torque is the minimum output torque in this region, i.e., the output torque at the intersection between the minimum motor torque command for the second electric machine 72 and maximum clutch reactive torque for the first applied clutch ('$T_{CL1}$ Max').

FIG. 5B depicts operation in one of the fixed gear operating range states. During ongoing operation in one of the fixed gear operating range states, the operator inputs to the accelerator pedal 113 and the brake pedal 112 are monitored to determine the operator torque request. The system calculates offset torques based upon inputs including the operating range state of the transmission 10, the input torque and terms based upon system inertias, system damping, and clutch slippage ('To Misc Opt', 'TCL1 Misc Opt', 'TCL2 Misc Opt') described hereinbelow with reference to Eqs. 20, 21, 22, and 23 (510'). The term 'CL1' designates a first applied clutch, i.e., one of clutches C1 70 and C2 62 in the embodiment described and 'TCL1' is the torque transferred across CL1. The term 'CL2' designates a second applied clutch, when applied, and includes one of C2 62, C3 73, and C4 75 in the embodiment described and 'TCL2' is the torque transferred across CL2. The offset torques are inputs to calculate linear output torque constraints (520') and calculate an unconstrained quadratic solution to the output torque (530').

The unconstrained quadratic solution to the output torque (530') is calculated using the power limits for the ESD 74, i.e., the available battery power $P_{BAT\_MIN}$ to $P_{BAT\_MAX}$, the offset motor torque constraints, motor torque characteristics defined in terms of coefficients for converting between mechanical torque and electric power in terms of efficiency and power loss in the first and second electric machines 56 and 72 ('Donut Space Coefficients') which are detailed in Eq. 11, and other scalar terms related to the torque outputs from the first and second electric machines 56 and 72 and the reactive torque of the applied clutch ('$K_{TA\ from\ To}$', '$K_{TB\ from\ To}$', '$K_{TCL1\ from\ To}$' '$K_{TCL2\ from\ To}$'), that are preferably determined along an optimal motor torque split line. The aforementioned inputs are used to calculate the first constraint on the output torque from the transmission 10, comprising the unconstrained quadratic solution, which includes the optimized output torque ('To*') and an optimized battery power ('$P^*_{BAT}$') for operating the system without concern for other constraints on the system (530), and described hereinabove with reference to Eqs. 15 and 16, and plotted with reference to FIG. 6A.

The linear output torque constraints, i.e., the minimum and maximum linear output torques ('To Min Linear', 'To Max Linear') (520') are determined based upon the offset torques, the scalar terms related to the output torque and the reactive torque of the applied clutches ('$k_{To\ From\ TA}$', '$k_{To\ From\ TB}$', '$k_{TA\ From\ TCL1}$', '$k_{TB\ From\ TCL1}$', '$k_{TA\ From\ TCL2}$', '$k_{TB\ From\ TCL2}$'), motor torque ranges comprising minimum and maximum motor torque limits of the first and second electric machines 56 and 72 ('$T_A$ Min', '$T_A$ Max', '$T_B$ Min', '$T_B$ Max'). Minimum and maximum clutch reactive torque constraints of the applied torque transfer clutches ('TCL1 Min', 'TCL1Max', 'TCL2 Min', 'TCL2Max'), comprising the specifically applied clutches for the selected operating range state, are determined. The constraints comprising the minimum and maximum linear output torques ('To Min Linear', 'To Max Linear') are determined, with the minimum linear output torque preferably comprising a maximum value of the aforementioned minimum torque values and the maximum linear output torque preferably comprising a minimum value of the aforementioned maximum torque values.

In both the mode operating range state and the fixed gear operating range state, the unconstrained quadratic solution to the output torque and the maximum and minimum linear output torques are combined with a preferred output torque to calculate a preferred output torque ('To Opt') and output torque constraints ('To Min Raw', 'To Max Raw') (540). The preferred output torque is described in terms of a search range ('To Min Search', 'To Max Search'), which preferably comprises the operator torque request, or another allowable torque constraint. The preferred output torque can comprise an output torque which minimizes battery power consumption within the output torque range and meets the operator torque request in this embodiment.

The output torque constraints ('To Min Raw', 'To Max Raw') comprise maximum and minimum unfiltered output torques that are determined based upon inputs including the input speed, output speed, motor torque constraints, reactive clutch torque constraints for the applied clutches, engine input torque, and input and output accelerations. The preferred output torque is subject to the output torque constraints and is determined based upon the range of allowable output torques, which can vary, and may include the immediate accelerator output torque request. The preferred output torque may comprise an output torque corresponding to a minimum battery discharge power or an output torque corresponding to a maximum battery charge power. The preferred output torque is based upon a capacity of the powertrain to transmit and convert electric power to mechanical torque through the first and second electric machines 56 and 72, and the immediate or present torque, speed, and reactive clutch torque constraints, and electric power inputs thereto.

The output torque constraints including the maximum and minimum unfiltered output torques ('To Min Raw', 'To Max Raw') and the preferred output torque ('To Opt') can be determined by executing and solving an optimization function in one of the operating range states for neutral, mode and fixed gear operation. The output torque constraints comprise a preferred output torque range at the present input torque, within the available battery power ('$P_{BAT}$Min/Max') and within the motor torque constraints comprising the ranges of available motor torques ('$T_A$ Min/Max', '$T_B$ Min/Max'), subject to the reactive clutch torques of the applied torque transfer clutch(es) ('TCL1 Min', 'TCL1 Max', 'TCL2 Min', 'TCL2 Max'). Under non-braking operation, the output torque request is constrained to a maximum output torque capacity.

The inputs used to determine the maximum and minimum constraints on the output torque and the preferred output torque include power output capacity of the ESD 74, including the available battery power and any DC load on the ESD 74, the motor torque characteristics defined in terms of coefficients for converting between mechanical torque and electric power in terms of efficiency and power loss in the first and second electric machines 56 and 72 ('Donut Space Coefficients'). Furthermore the present operating range state of the transmission ('Hybrid Range State'), the input torque, the input speed ('$N_I$'), output speed ('$N_O$'), clutch speed ('$N_C$'), acceleration of slipping clutches ('Ncsdot'), acceleration of the output member 64 ('Nodot'), and acceleration of the input member 12 ('Nidot') and maximum and minimum reactive clutch torques for the applied clutch(es) ('TCL1 Min', 'TCL1 Max', 'TCL2 Min', 'TCL2 Max') and estimated torques of the non-applied, slipping clutches ('Tcs') are monitored. The aforementioned accelerations are preferably based upon acceleration profiles with targeted acceleration rates, but can be actual accelerations. The ranges of available motor torques for the first and second electric machines 56 and 72 are also monitored and used as described hereinabove.

The optimization function preferably comprises a linear equation that is implemented in an executable algorithm and solved during ongoing operation of the system to determine the preferred output torque range to minimize battery power consumption and meet the operator torque request. The linear equation takes into account the input torque ('Ti'), system inertias and linear damping. Preferably, there is a linear equation for each of the operating range states for mode operation.

When the transmission 14 is in one of the mode operating range states the linear equation for the system is Eq. 17:

$$\begin{bmatrix} T_A \\ T_B \\ T_{CL1} \end{bmatrix} = \begin{bmatrix} k_{T_A \, From \, T_O} \\ K_{T_B \, From \, T_O} \\ K_{T_{CL1} \, From \, T_O} \end{bmatrix} T_O + \begin{bmatrix} k_{T_A \, From \, T_I} \\ K_{T_B \, From \, T_I} \\ K_{T_{CL1} \, From \, T_I} \end{bmatrix} T_I + \begin{bmatrix} a11 & a12 \\ a21 & a22 \\ a31 & a32 \end{bmatrix} * \begin{bmatrix} Nidot \\ Nodot \end{bmatrix} + \begin{bmatrix} b11 & b12 \\ b21 & b22 \\ b31 & b32 \end{bmatrix} * \begin{bmatrix} N_I \\ N_O \end{bmatrix} + \begin{bmatrix} c11 & c12 & c13 \\ c21 & c22 & c23 \\ c31 & c32 & c33 \end{bmatrix} * \begin{bmatrix} Tcs1 \\ Tcs2 \\ Tcs3 \end{bmatrix}$$ [17]

Eq. 17 can be solved to determine a preferred output torque which minimizes the battery power and meets the operator torque request. The TCL1 term represents reactive torque transfer across the applied clutch for the mode operation, i.e., clutch C1 62 in Mode 1 and clutch C2 70 in Mode 2. The terms Tcs1, Tcs2, Tcs3 represent torque transfer across the non-applied, slipping clutches for the specific mode operation. The term $$\begin{bmatrix} k_{T_A \, From \, T_I} \\ k_{T_B \, From \, T_I} \\ k_{T_{CL1} \, From \, T_I} \end{bmatrix} T_I$$

represents contributions to the motor torques ($T_A$, $T_B$) and the reactive torque transfer across the applied clutch $T_{CL1}$ due to the input torque $T_I$. The scalar terms are based upon the torque outputs from the first and second electric machines 56 and 72 and the reactive torque of the applied clutch related to the input torque ('$k_{TA\,from\,TI}$', '$k_{TB\,from\,TI}$', '$k_{TCL1\,from\,TI}$') determined for the specific system application.

The term $$\begin{bmatrix} k_{T_A \, From \, T_O} \\ k_{T_B \, From \, T_O} \\ k_{T_{CL1} \, From \, T_O} \end{bmatrix} T_O$$

represents contributions to the motor torques ($T_A$, $T_B$) and the reactive torque transfer across the applied clutch $T_{CL1}$ due to the output torque $T_O$. The scalar terms are based upon the torque outputs from the first and second electric machines 56 and 72 and the reactive torque of the applied clutch related to the input torque ('$k_{TA\,from\,To}$', '$k_{TB\,from\,To}$', '$k_{TCL1\,from\,To}$') determined for the specific system application.

The term $$\begin{bmatrix} a11 & a12 \\ a21 & a22 \\ a31 & a32 \end{bmatrix} * \begin{bmatrix} Nidot \\ Nodot \end{bmatrix}$$

represents contributions to the motor torques ($T_A$, $T_B$) and the reactive torque transfer across the applied clutch $T_{CL1}$ due to system inertias, having two degrees of freedom. The input acceleration term and the output acceleration term are selected as two linearly independent system accelerations which can be used to characterize the inertias of the components of the powertrain system. The a11-a32 terms are system-specific scalar values determined for the specific system application.

The term $$\begin{bmatrix} b11 & b12 \\ b21 & b22 \\ b31 & b32 \end{bmatrix} * \begin{bmatrix} N_I \\ N_O \end{bmatrix}$$

represents contributions to the motor torques ($T_A$, $T_B$) and the reactive torque transfer across the applied clutch $T_{CL1}$ due to linear damping, having two degrees of freedom, selected as two linearly independent system speeds, i.e., the input and output speeds, which can be used to characterize the damping of the components of the powertrain system. The b11-b32 terms are system-specific scalar values determined for the specific system application. The term $$\begin{bmatrix} c11 & c12 & c13 \\ c21 & c22 & c23 \\ c31 & c32 & c33 \end{bmatrix} * \begin{bmatrix} Tcs1 \\ Tcs2 \\ Tcs3 \end{bmatrix}$$

represents contributions to the motor torques ($T_A$, $T_B$) and the reactive torque transfer across the applied clutch $T_{CL1}$ due to non-applied, slipping clutch torques. The Tcs1, Tcs2, and Tcs3 terms represent clutch torques across the non-applied, slipping torque transfer clutches. The c11-c33 terms are system-specific scalar values determined for the specific system application.

Eq. 17 can be rewritten as Eq. 18:

$$\begin{bmatrix} T_A \\ T_B \\ T_{CL1} \end{bmatrix} = \begin{bmatrix} k_{T_A \, From \, T_O} \\ k_{T_B \, From \, T_O} \\ k_{T_{CL1} \, From \, T_O} \end{bmatrix} T_O + \begin{bmatrix} k_{T_A \, From \, T_I} \\ k_{T_B \, From \, T_I} \\ k_{T_{CL1} \, From \, T_I} \end{bmatrix} T_I + \begin{bmatrix} T_A Misc \\ T_B Misc \\ T_{CL1} Misc \end{bmatrix}$$ [18]

with the offset motor torques based upon inputs including the operating range state of the transmission 10, the input torque and terms based upon system inertias, system damping, and clutch slippage ('$T_A$ Misc', '$T_B$ Misc', '$T_{CL1}$ Misc') combined into a single vector.

For an input torque $T_I$, Eq. 18 reduces to Eq. 19 as follows.

$$\begin{bmatrix} T_A \\ T_B \\ T_{CL1} \end{bmatrix} = \begin{bmatrix} k_{T_A \, From \, T_O} \\ k_{T_B \, From \, T_O} \\ k_{T_{CL1} \, From \, T_O} \end{bmatrix} T_O + \begin{bmatrix} T_A \text{Offset} \\ T_B \text{Offset} \\ T_{CL1} \text{Offset} \end{bmatrix}$$ [19]

Eq. 19 can be solved using the preferred output torque ('To Opt') to determine preferred motor torques from the first and second electric machines 56 and 72 ('$T_A$ Opt', '$T_B$ Opt') (550). Preferred battery powers ('$P_{BAT}$ Opt', '$P_A$ Opt', '$P_B$ Opt') can be calculated based thereon (560).

When the transmission 14 is in one of the fixed gear operating range states the linear equation for the system is Eq. 20.

$$\begin{bmatrix} T_O \\ T_{CL1} \\ T_{CL2} \end{bmatrix} = \begin{bmatrix} k_{T_O \text{ From } T_A} & k_{T_O \text{ From } T_B} \\ k_{T_{CL1} \text{ From } T_A} & k_{T_{CL1} \text{ From } T_B} \\ k_{T_{CL2} \text{ From } T_A} & k_{T_{CL2} \text{ From } T_B} \end{bmatrix} * \begin{bmatrix} T_A \\ T_B \end{bmatrix} + \begin{bmatrix} k_{T_O \text{ From } T_I} \\ k_{T_{CL1} \text{ From } T_I} \\ k_{T_{CL1} \text{ From } T_I} \end{bmatrix} \quad [20]$$

$$T_I + \begin{bmatrix} a11 \\ a21 \\ a31 \end{bmatrix} * N_I + \begin{bmatrix} b11 \\ b21 \\ b31 \end{bmatrix} * Nidot + \begin{bmatrix} c11 & c12 \\ c21 & c22 \\ c31 & c32 \end{bmatrix} * \begin{bmatrix} Tcs1 \\ Tcs2 \end{bmatrix}$$

Eq. 20 can be solved to determine a preferred output torque which minimizes the battery power and meets the operator torque request. The $T_{CL1}$ and $T_{CL2}$ terms represent reactive torque transfer across the applied clutches for the fixed gear operation. The terms Tcs1 and Tcs2 represent torque transfer across the non-applied, slipping clutches for the specific fixed gear operation.

The term $$\begin{bmatrix} k_{T_O \text{ From } T_I} \\ k_{T_{CL1} \text{ From } T_I} \\ k_{T_{CL2} \text{ From } T_I} \end{bmatrix} * T_I$$

represents contributions to the output torque To and the reactive torque transfer across the applied clutches $T_{CL1}$ and $T_{CL2}$ due to the input torque $T_I$. The scalar terms are based upon the output torque and the reactive torques of the applied clutches related to the input torque ('$k_{To \text{ from } TI}$', '$k_{TCL1 \text{ from } TI}$', '$k_{TCL2 \text{ from } TI}$') determined for the specific system application.

The term $$\begin{bmatrix} k_{T_O \text{ From } T_A} & k_{T_O \text{ From } T_B} \\ k_{T_{CL1} \text{ From } T_A} & k_{T_{CL1} \text{ From } T_B} \\ k_{T_{CL2} \text{ From } T_A} & k_{T_{CL2} \text{ From } T_B} \end{bmatrix} * \begin{bmatrix} T_A \\ T_B \end{bmatrix}$$

represents contributions to the output torques and the reactive torque transfer across the applied clutches due to the motor torques $T_A$ and $T_B$. The scalar terms are based upon the output torque and the reactive torque of the applied clutches related to the torque outputs from the first and second electric machines 56 and 72 determined for the specific system application.

The term $$\begin{bmatrix} b11 \\ b21 \\ b31 \end{bmatrix} * Nidot$$

represents contributions to the output torques and the reactive torque transfer across the applied clutches (TCL1, TCL2) due to system inertias, having a single degree of freedom. The input acceleration term is selected as a linearly independent system acceleration which can be used to characterize the inertias of the components of the powertrain system. The b11-b31 terms are system-specific scalar values determined for the specific system application.

The term $$\begin{bmatrix} a11 \\ a21 \\ a31 \end{bmatrix} * N_I$$

represents contributions to the output torques and the reactive torque transfer across the applied clutches $T_{CL1}$ and $T_{CL2}$ due to linear damping, having a single degree of freedom, selected as a linearly independent system speed which can be used to characterize the damping of the components of the powertrain system. The a11-a31 terms are system-specific scalar values determined for the specific system application.

The term $$\begin{bmatrix} c11 & c12 \\ c21 & c22 \\ c31 & c32 \end{bmatrix} * \begin{bmatrix} Tcs1 \\ Tcs2 \end{bmatrix}$$

represents contributions to the output torque and the reactive torque transfer across the applied clutches $T_{CL1}$ and $T_{CL2}$ due to non-applied, slipping clutch torques. The Tcs1 and Tcs2 terms represent clutch torques across the non-applied, slipping torque transfer clutches. The c11-c32 terms are system-specific scalar values determined for the specific system application.

Eq. 20 can be rewritten as Eq. 21:

$$\begin{bmatrix} T_O \\ T_{CL1} \\ T_{CL2} \end{bmatrix} = \begin{bmatrix} k_{T_O \text{ From } T_A} & k_{T_O \text{ From } T_B} \\ k_{T_{CL1} \text{ From } T_A} & k_{T_{CL1} \text{ From } T_B} \\ k_{T_{CL2} \text{ From } T_A} & k_{T_{CL2} \text{ From } T_B} \end{bmatrix} \begin{bmatrix} T_A \\ T_B \end{bmatrix} + \quad [21]$$

$$\begin{bmatrix} k_{T_O \text{ From } T_I} \\ k_{T_{CL1} \text{ From } T_I} \\ k_{T_{CL1} \text{ From } T_I} \end{bmatrix} T_I + \begin{bmatrix} k_{T_O \text{Misc}} \\ k_{T_{CL1} \text{Misc}} \\ k_{T_{CL2} \text{Misc}} \end{bmatrix}$$

For an input torque $T_I$, Eq. 21 can be rewritten as Eq. 22:

$$\begin{bmatrix} T_O \\ T_{CL1} \\ T_{CL2} \end{bmatrix} = \begin{bmatrix} k_{T_O \text{ From } T_A} & k_{T_O \text{ From } T_B} \\ k_{T_{CL1} \text{ From } T_A} & k_{T_{CL1} \text{ From } T_B} \\ k_{T_{CL2} \text{ From } T_A} & k_{T_{CL2} \text{ From } T_B} \end{bmatrix} \begin{bmatrix} T_A \\ T_B \end{bmatrix} + \begin{bmatrix} T_O \text{Offset} \\ T_{CL1} \text{Offset} \\ T_{CL2} \text{Offset} \end{bmatrix} \quad [22]$$

with the output torque and the reactive torque transfer across the applied clutches $T_{CL1}$ and $T_{CL2}$ based upon the motor torques with the operating range state of the transmission 10, and terms based upon input torque, system inertias, system damping, and clutch slippage ('$T_O$ Offset', '$T_{CL1}$ Offset', '$T_{CL2}$_Offset') combined into a single vector. Eq. 22 can be solved using the preferred output torque ('To Opt') determined in Eq. 20 to determine preferred motor torques from the first and second electric machines 56 and 72, including determining preferred motor torque split ('$T_A$ Opt', '$T_B$ Opt') (550').

The motor torque commands can be used to control the first and second electric machines 56 and 72 to transfer output torque to the output member 64 and thence to the driveline 90 to generate tractive torque at wheel(s) 93 to propel the vehicle in response to the operator input to the accelerator pedal 113. Preferably, propelling the vehicle results in vehicle acceleration so long as the output torque is sufficient to overcome external loads on the vehicle, e.g., due to road grade, aerodynamic loads, and other loads.

Figure 7:
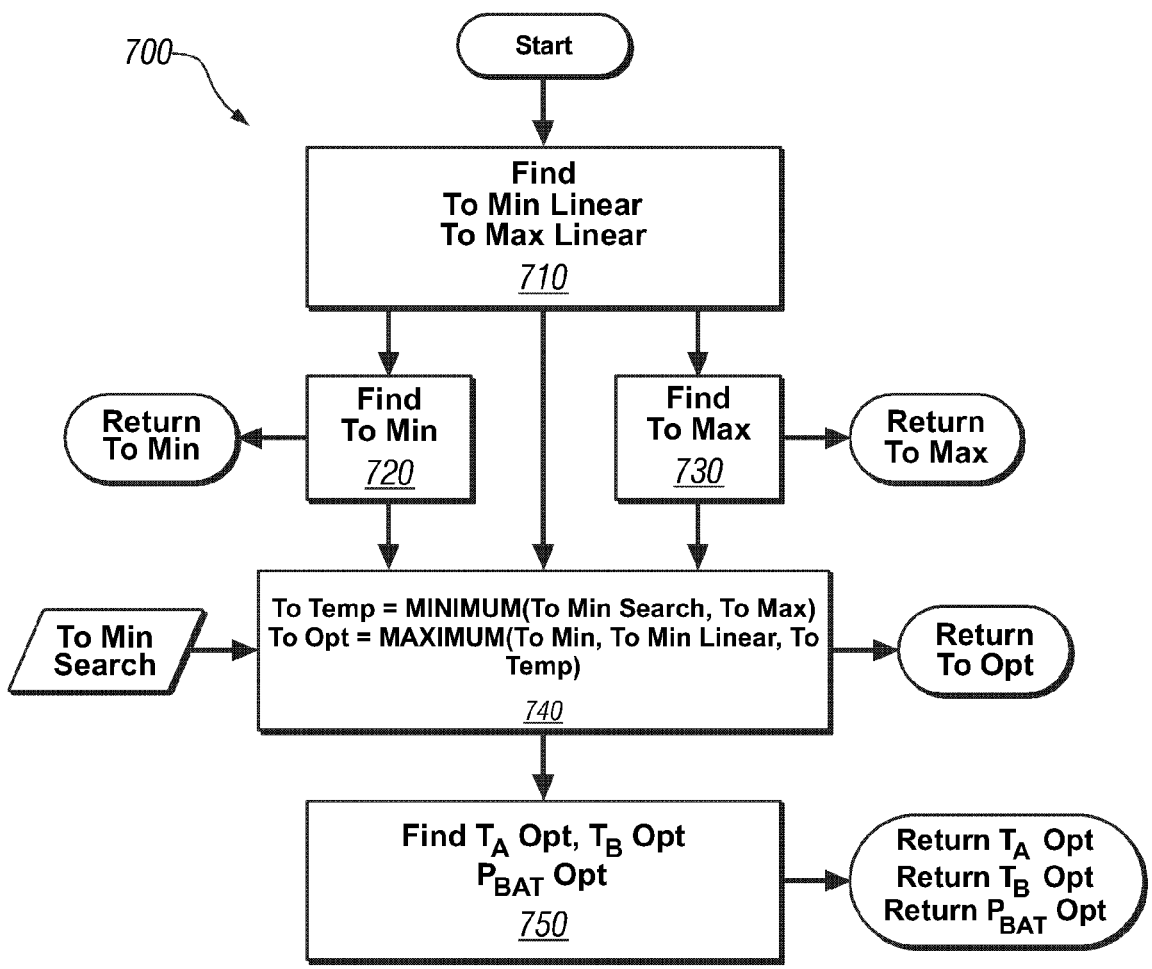
FIGS. 7, 8, and 9 are algorithmic flowcharts, in accordance with the present disclosure.

FIG. 7 shows a process (700) for determining a preferred output torque ('To Opt') including preferred motor torques for controlling the first and second electric machines 56 and 72 ('$T_A$ Opt', '$T_B$ Opt') and a preferred battery power ('$P_{BAT}$ Opt') based thereon. This includes determining the minimum and maximum linear output torques ('To Min Linear', 'To Max Linear') (710), and thus determining minimum and maximum output torques ('To Min') (720) and ('To Max') (730). A search is executed to determine a minimum output torque, and the preferred output torque can be calculated ('To Opt') (740). This includes selecting a temporary output torque comprising a minimum value of the minimum of the search range for the output torque ('To Min Search') and the maximum output torque ('To Max'). The preferred output torque is selected as the maximum of the temporary output torque, the minimum output torque, and the minimum linear output torque. Preferred motor torques and battery powers ('Ta Opt', 'Tb Opt', and '$P_{BAT}$ Opt') can be determined based upon the preferred output torque (750), and used to control operation of the powertrain system.

Figure 8:
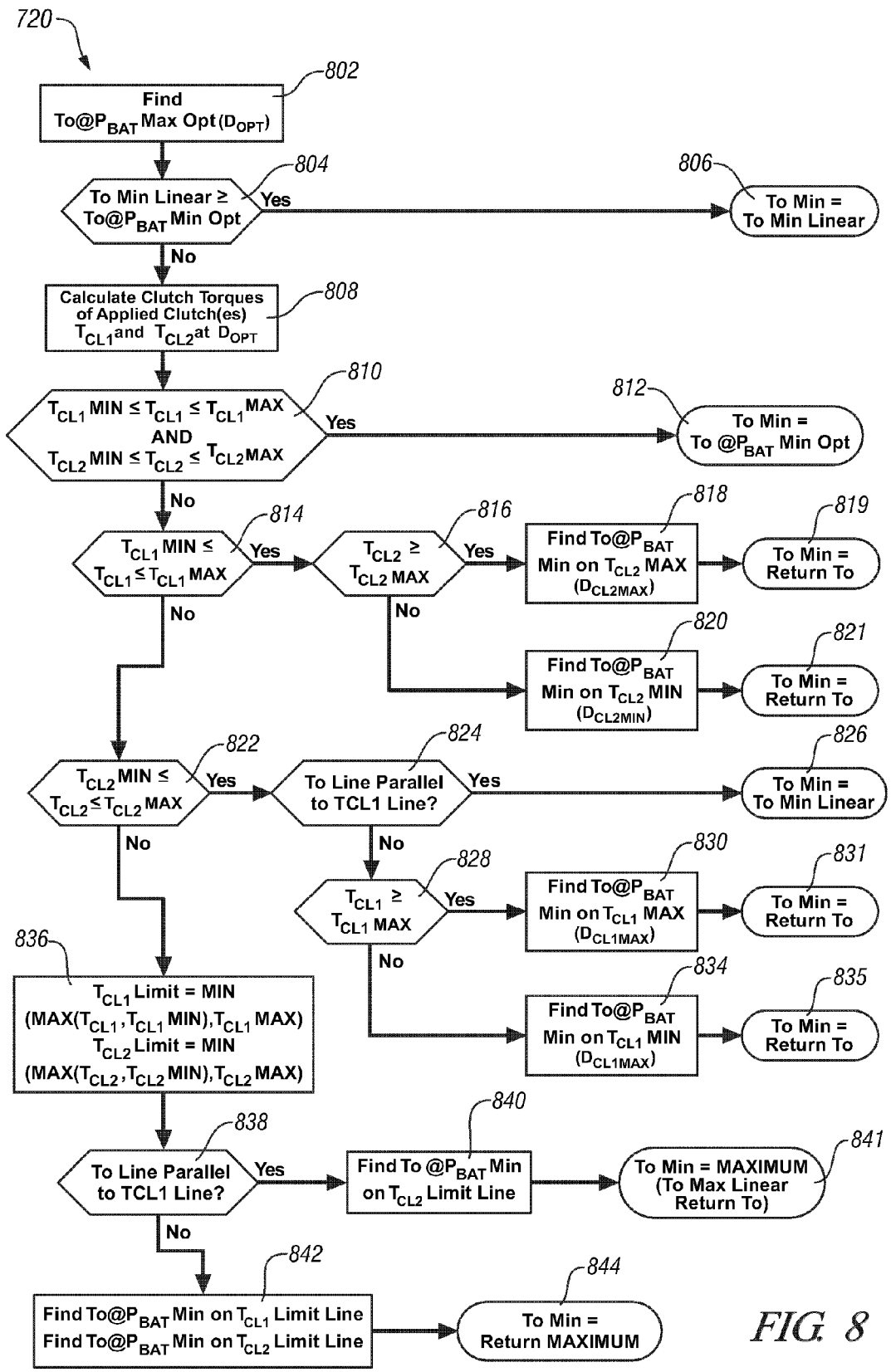
Figure 10:
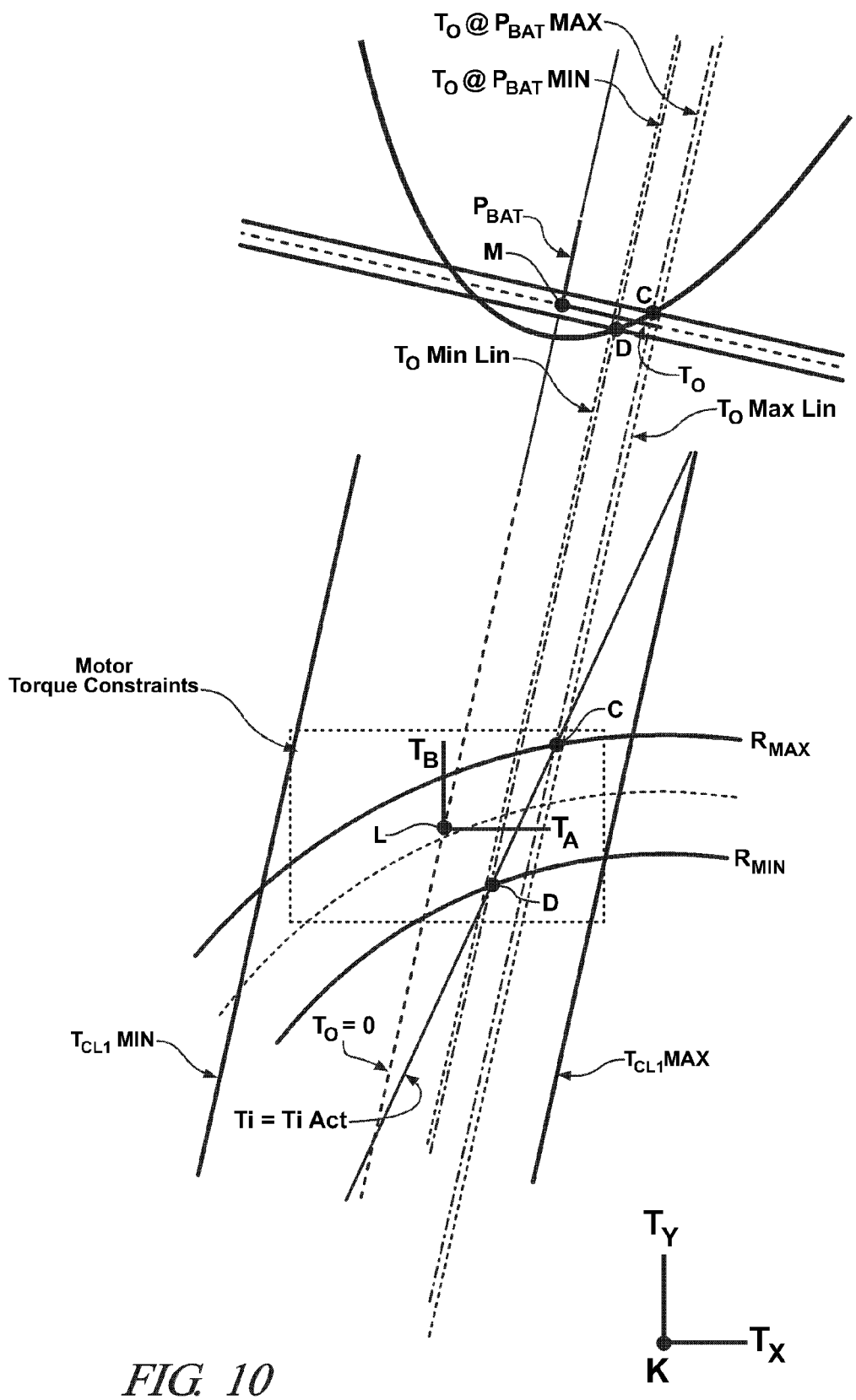
FIG. 10 is a graphical depiction, in accordance with the present disclosure.

FIG. 8 shows a flowchart 720 for determining the minimum output torque ('To Min'). FIGS. 10 and 11 show results illustrative of the concept, when operating in a fixed gear operating range state. The preferred output torque at maximum charging battery power ('To@$P_{BAT}$ Min Pos Root') can be determined ('$D_{OPT}$'), as described herein with reference to FIG. 6 and Eqs. 15 and 16 (802). The preferred output torque at maximum charging battery power is compared to the minimum linear output torque ('To Min Lin') (804). When the minimum linear output torque is greater than or equal to the preferred output torque at maximum charging battery power, the output torque is set equal to the minimum linear output torque (806). This is the preferred output torque returned to the process 700 at 720 as the minimum output torque To Min.

When the minimum linear output torque is less than the preferred output torque at minimum charging battery power, clutch torques for the applied clutches are determined for operating the powertrain system at the preferred output torque at maximum charging battery power (808). For purposes of the figures, the applied clutches are referred to as 'CL1,' and 'CL2', wherein the applied clutches are specific to the selected transmission operating range state. When the transmission 10 is operating in one of the mode operating range states, i.e., M1 and M2 in this embodiment, torques and forces related to clutch CL2 are ignored. When the clutch torques for the first and second applied clutches CL1 and CL2 are between respective minimum and maximum clutch reactive torques and thus achievable (810), the output torque is set equal to the preferred output torque at the maximum charging battery power (812).

When the clutch torque for the first applied clutch CL1 is within respective minimum and maximum clutch reactive torques and thus achievable (814), the clutch torque for the second applied clutch CL2 is compared to a maximum achievable clutch torque (816), and when greater, the preferred output torque ('To Min') is determined to be a maximum charging battery power ('To@$P_{BAT}$Min') at a point ('$D_{CL2MAX}$') at which the output torque meets the maximum achievable clutch torque for the second applied clutch CL2 ('$T_{CL2}$MAX') and is within the battery power constraints and the motor torque constraints (818). This is the preferred output torque returned to the process 700 at 720 as the minimum output torque To Min (819).

When the second applied clutch CL2 is less than the maximum achievable clutch torque (816), i.e., less than $T_{CL2}$Min, the preferred output torque ('To Min') is determined to be a maximum charging battery power ('To@$P_{BAT}$Min') at a point ('$D_{CL2MIN}$') at which the output torque meets the minimum achievable clutch torque for the second applied clutch CL2 ('$T_{CL2}$MIN') and is within the battery power constraints and the motor torque constraints (820). This is the preferred output torque returned to the process 700 at 720 as the minimum output torque To Min (821).

When the clutch torque for the first applied clutch CL1 is not within respective minimum and maximum clutch reactive torques (814), it is determined whether the clutch torque for the second applied clutch CL2 is within respective minimum and maximum clutch reactive torques and is thus achievable (822). When the clutch torque for the second applied clutch CL2 is within respective minimum and maximum clutch reactive torques, a slope of the output torque line ('To') is compared to the slope of the clutch torque for the first applied clutch CL1 (824). When the output torque line ('To') is parallel to the clutch torque for the first applied clutch CL1 ('$T_{CL1}$'), the minimum output torque ('To Min') is determined to be the minimum linear output torque ('To Min Lin') (826). This is the preferred output torque returned to the process 700 at 720 as the minimum output torque To Min.

When the clutch torque for the first applied clutch CL1 ('$T_{CL1}$') is greater than the maximum clutch torque of the first applied clutch CL1 ('$T_{CL1}$MAX') (828, 830), the preferred output torque ('To Min') is determined to be the maximum charging battery power ('To@$P_{BAT}$Min') at a point ('$D_{CL1MAX}$') at which the output torque which meets the maximum achievable clutch torque for CL1 ('$T_{CL1MAX}$') and is within the battery power constraints and the motor torque constraints (830). This is the preferred output torque returned to the process 700 at 720 as the minimum output torque To Min (831).

When the output torque line ('To') is not parallel to the clutch torque for the first applied clutch CL1 ('$T_{CL1}$'), and when the clutch torque for the first applied clutch CL1 ('$T_{CL1}$') is less than the minimum clutch torque of the first applied clutch CL1 ('$T_{CL1}$MAX') (828, 834), i.e., less than $T_{CL2}$Min, the preferred output torque ('To Min') is determined to be the maximum charging battery power ('To@$P_{BAT}$Min') at a point ('$D_{CL1MIN}$') at which the output torque which meets the minimum achievable clutch torque for CL1 ('$T_{CL1}$MIN') and is within the battery power constraints and the motor torque constraints (834). This is the preferred output torque returned to the process 700 at 720 as the minimum output torque To Min (835).

When the clutch torque for the second applied clutch CL2 is outside the respective minimum and maximum clutch reactive torques, a clutch torque limit ('$T_{CL1}$Limit') for the first applied clutch CL1 is set to a minimum of the maximum clutch torque of the first applied clutch CL1 ('$T_{CL1}$MAX') and a maximum of the first clutch torque ('$T_{CL1}$') and a minimum clutch torque of the first applied clutch CL1 ('$T_{CL1}$MIN'). A clutch torque limit ('$T_{CL2}$Limit') for the second applied clutch CL2 is set to a minimum of the maximum clutch torque of the second applied clutch CL2 ('$T_{CL2}$MAX') and a maximum of the second clutch torque ('$T_{CL2}$') and a minimum clutch torque of the second applied clutch CL2 ('$T_{CL2}$MIN') (836).

Subsequently, a slope of the output torque line ('To') is compared to the slope of the clutch torque line for the first applied clutch CL1 (838). When the output torque line ('To') is parallel to the clutch torque for the first applied clutch CL1 ('$T_{CL1}$'), the output torque ('Return To') at the maximum charging battery power ('To@$P_{BAT}$Min') at a point that is within the battery power constraints and the motor torque constraints and meeting limits of the clutch torque of the second applied clutch CL2 ('$T_{CL2}$Limit') is determined (840). The minimum output torque ('To min') is determined to be the maximum of the maximum linear output torque ('To Max Lin') and the return output torque ('Return To') (841). This is the preferred output torque returned to the process 700 at 720 as the minimum output torque To Min.

When the output torque line ('To') is not parallel to the clutch torque for the first applied clutch CL1 ('$T_{CL1}$'), a first output torque is determined at the maximum charging battery power ('To@$P_{BAT}$Min') at a point that is within the battery power constraints and the motor torque constraints and that meets limits of the clutch torque of the first applied clutch CL1 ('$T_{CL1}$Limit'). A second output torque is determined at the maximum charging battery power ('To@$P_{BAT}$Min') at a point that is within the battery power constraints and the motor torque constraints and that meets limits of the clutch torque of the second applied clutch CL2 ('$T_{CL2}$Limit') (842). The preferred output torque is a maximum of the first and second output torque, which is returned to the process 700 at 720 as the minimum output torque To Min (844).

Figure 9:
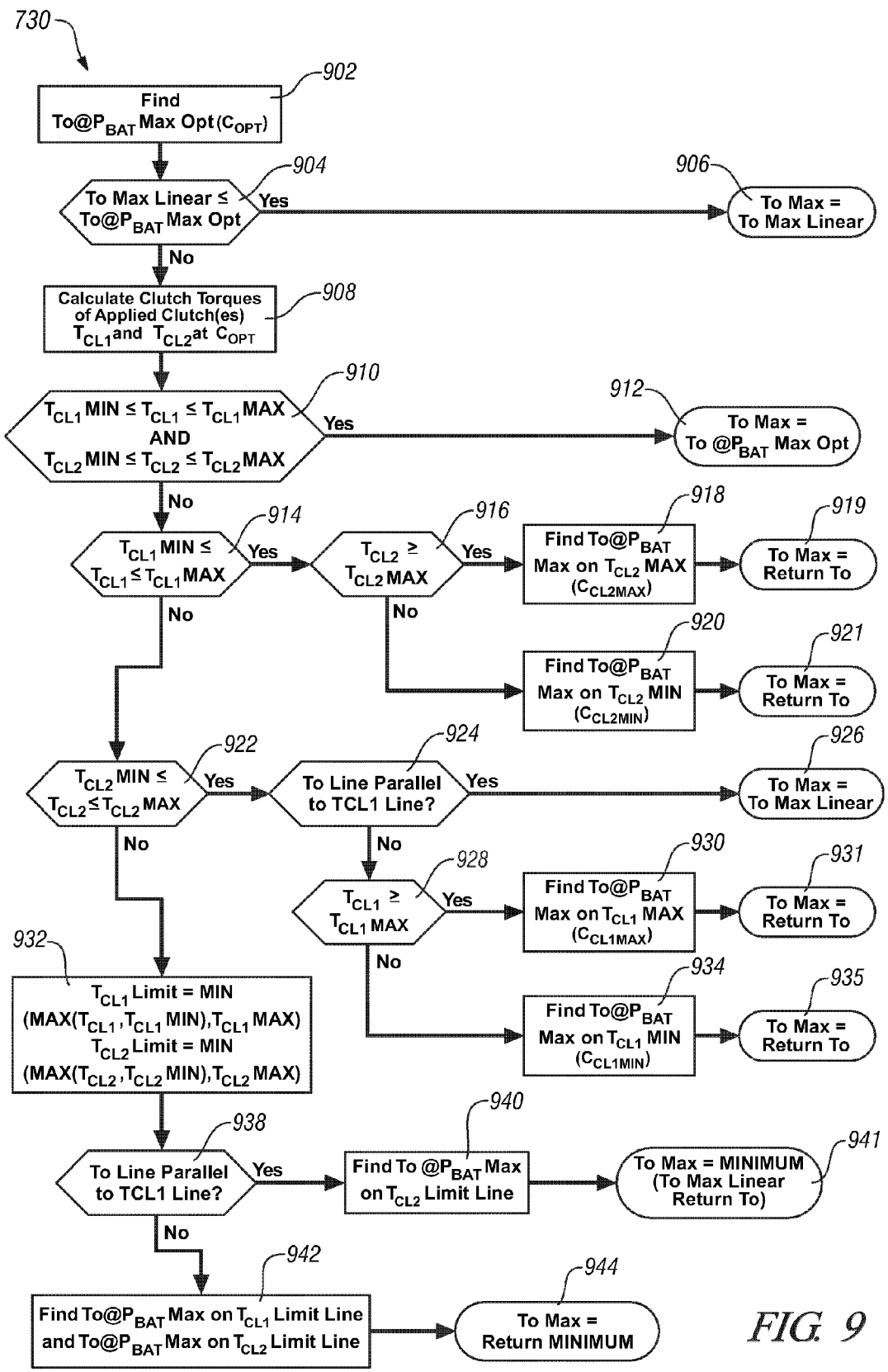

FIG. 9 shows a flowchart 730 for determining the maximum output torque ('To Min'). FIGS. 10 and 11 show results illustrative of the concept. The preferred output torque at maximum discharging battery power ('To@$P_{BAT}$ Max Opt'), which comprises 'To@$P_{BAT}$ Max Pos Root' of FIG. 6, can be determined ('$C_{OPT}$') as described herein with reference to FIG. 6 and Eqs. 15 and 16 (902). The preferred output torque at maximum discharging battery power is compared to the maximum linear output torque ('To Max Lin') (904). When the preferred output torque at the maximum discharging battery power is greater than the maximum linear output torque, the output torque ('$C_{OPT}$') is set equal to the maximum linear output torque (906). This is the preferred output torque returned to the process 700 at 720 as the maximum output torque To Max.

When the preferred output torque at maximum discharging battery power is less than or equal to the maximum linear output torque, clutch torques for the applied clutches are determined for operating the powertrain system at the preferred output torque at maximum discharging battery power (908). For purposes of this figure, the applied clutches are referred to as 'CL1,' and 'CL2', wherein the applied clutches are specific to the selected transmission operating range state. When the transmission 10 is operating in one of the mode operating range states, i.e., M1 and M2 in this embodiment, torques and forces related to clutch CL2 are ignored. When the clutch torques for the first and second applied clutches CL1 and CL2 are between respective minimum and maximum clutch reactive torques and thus achievable (910), the output torque is set equal to the preferred output torque at the maximum discharging battery power (912).

When the clutch torque for the first applied clutch CL1 is within respective minimum and maximum clutch reactive torques and thus achievable (914), the clutch torque for the second applied clutch CL2 is compared to a maximum achievable clutch torque (916), and when greater, the preferred output torque ('To Max') is determined to be a maximum discharging battery power ('To@$P_{BAT}$Max') at a point ('$C_{CL2MAX}$') at which the output torque meets the maximum achievable clutch torque for the second applied clutch CL2 ('$T_{CL2}$MAX') and is within the battery power constraints and the motor torque constraints (918). This is the preferred output torque returned to the process 700 at 720 as the maximum output torque To Max (919).

When the second applied clutch CL2 is less than the maximum achievable clutch torque (916), the preferred output torque ('To Max') is determined to be a maximum discharging battery power ('To@$P_{BAT}$Max') at a point ('$C_{CL2MIN}$') at which the output torque meets the minimum achievable clutch torque for the second applied clutch CL2 ('$T_{CL2}$MIN') and is within the battery power constraints and the motor torque constraints (920). This is the preferred output torque returned to the process 700 at 720 as the maximum output torque To Max (921).

When the clutch torque for the first applied clutch CL1 is not within respective minimum and maximum clutch reactive torques (914), it is determined whether the clutch torque for the second applied clutch CL2 is within respective minimum and maximum clutch reactive torques and is thus achievable (922). When the clutch torque for the second applied clutch CL2 is within respective minimum and maximum clutch reactive torques, a slope of the output torque line ('To') is compared to the slope of the clutch torque for the first applied clutch CL1 (924). When the output torque line ('To') is parallel to the clutch torque for the first applied clutch CL1 ('$T_{CL1}$'), the preferred output torque ('To Max') is determined to be the maximum linear output torque ('To Max Lin') (926). This is the preferred output torque returned to the process 700 at 720 as the maximum output torque To Max.

When the output torque line ('To') is not parallel to the clutch torque for the first applied clutch CL1 ('$T_{CL1}$'), when the clutch torque for the first applied clutch CL1 ('$T_{CL1}$') is greater than the maximum clutch torque of the first applied clutch CL1 ('$T_{CL1}$MAX') (928, 930), the preferred output torque ('To Max') is determined to be the maximum discharging battery power ('To@$P_{BAT}$Max') at a point ('$C_{CL1MAX}$') at which the output torque which meets the maximum achievable clutch torque for CL1 ('$T_{CL1}$MAX') and is within the battery power constraints and the motor torque constraints (930). This is the preferred output torque returned to the process 700 at 720 as the maximum output torque To Max (931).

When the clutch torque for the first applied clutch CL1 ('$T_{CL1}$') is less than the maximum clutch torque of the first applied clutch CL1 ('$T_{CL1}$MAX') (928, 934), the preferred output torque ('To Max') is determined to be the maximum discharging battery power ('To@$P_{BAT}$Max') at a point ('$C_{CL1MIN}$') at which the output torque which meets the minimum achievable clutch torque for CL1 ('$T_{CL1}$MIN') and is within the battery power constraints and the motor torque constraints (934). This is the preferred output torque returned to the process 700 at 720 as the maximum output torque To Max (935).

When the clutch torque for the second applied clutch CL2 is outside the respective minimum and maximum clutch reactive torques, a clutch torque limit ('$T_{CL1}$ Limit') for the first applied clutch CL1 is set to a minimum of the maximum clutch torque of the first applied clutch CL1 ('$T_{CL1}$MAX') and a maximum of the first clutch torque ('$T_{CL1}$') and a minimum clutch torque of the first applied clutch CL1 ('$T_{CL1}$MIN'). A clutch torque limit ('$T_{CL2}$ Limit') for the second applied clutch CL2 is set to a minimum of the maximum clutch torque of the second applied clutch CL2 ('$T_{CL2}$MAX') and a maximum of the second clutch torque ('$T_{CL2}$') and a minimum clutch torque of the second applied clutch CL2 ('$T_{CL2}$MIN') (932). Subsequently, a slope of the output torque line ('To') is compared to the slope of the clutch torque for the first applied clutch CL1 (938). When the output torque line ('To') is parallel to the clutch torque for the first applied clutch CL1 ('$T_{CL1}$'), the output torque ('Return To') at the maximum discharging battery power ('To@$P_{BAT}$Max')

at a point that is within the battery power constraints and the motor torque constraints and meeting limits of the clutch torque of the second applied clutch CL2 ('$T_{CL2}$Limit') is determined (940). The maximum output torque ('To Max') is determined to be the minimum of the maximum linear output torque ('To Max Lin') and the return output torque ('Return To') (941). This is the preferred output torque returned to the process 700 at 720 as the maximum output torque To Max.

When the output torque line ('To') is not parallel to the clutch torque for the first applied clutch CL1 ('$T_{CL1}$'), a first output torque is determined at the maximum discharging battery power ('To@$P_{BAT}$Max') at a point that is within the battery power constraints and the motor torque constraints and that meets limits of the clutch torque of the first applied clutch CL1 ('$T_{CL1}$ Limit'). A second output torque is determined at the maximum discharging battery power ('To@$P_{BAT}$Max') at a point that is within the battery power constraints and the motor torque constraints and that meets limits of the clutch torque of the second applied clutch CL2 ('$T_{CL2}$ Limit') (942). The preferred output torque is a minimum of the first and second output torques, which is returned to the process 700 at 720 as the maximum output torque To Max (944).

Figure 4:
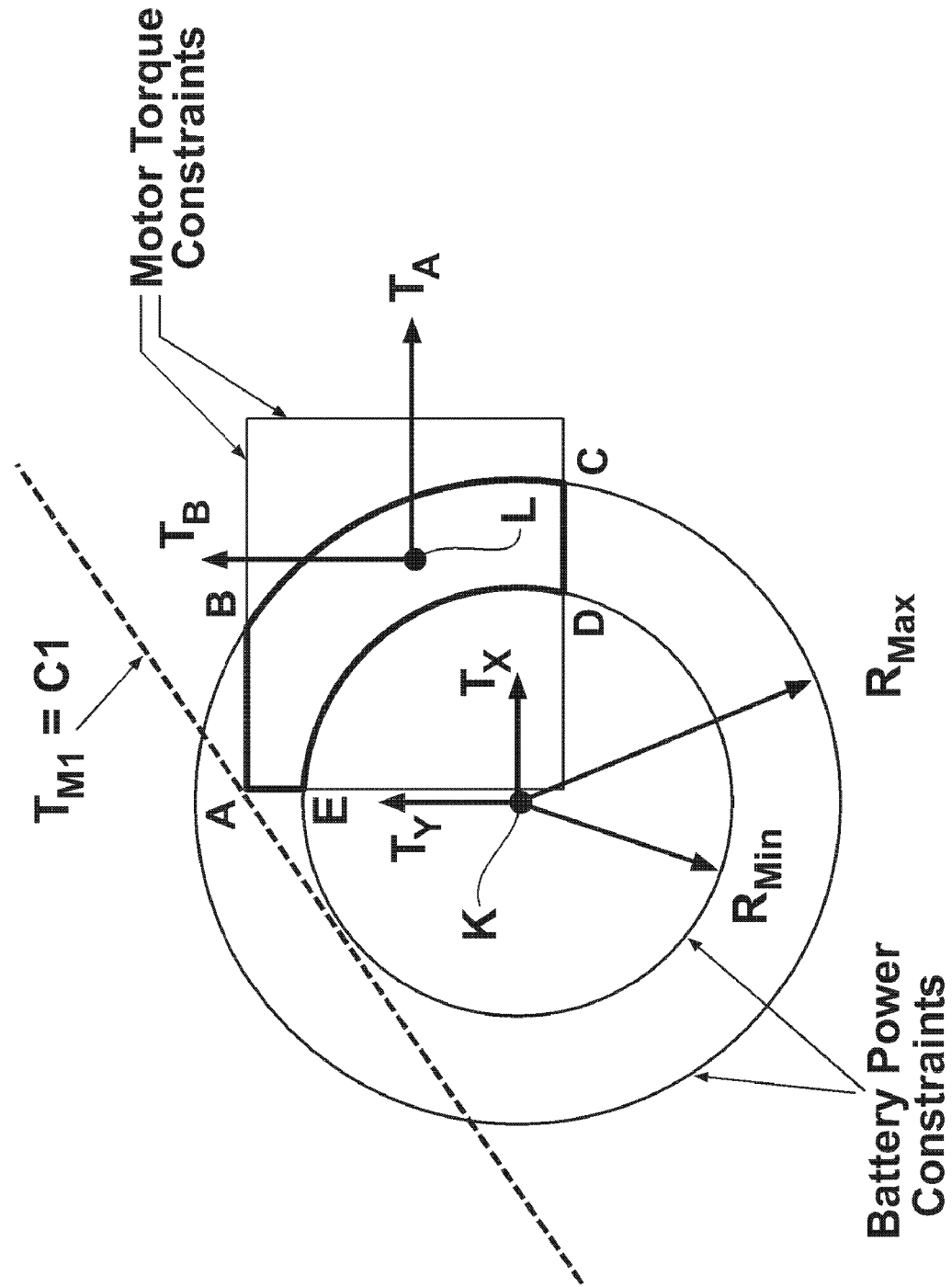
FIG. 4 is a graphical depiction, in accordance with the present disclosure.

FIG. 10 graphically shows operation of the control scheme to control the powertrain system described with reference to FIGS. 1, 2, and 3, utilizing the graphical mathematical constructs described with reference to FIGS. 4 and 6. The first coordinate system L depicts $T_A/T_B$ space, and is based upon motor torques $T_A$ and $T_B$. The second coordinate system K depicts motor torques $T_A$ and $T_B$ transformed to the $T_X/T_Y$ space, described with reference to FIG. 4 and Eqs. 1-12, and is plotted in relationship to the first coordinate system L and the $T_A/T_B$ space. The third coordinate system M depicts $P_{BAT}/T_O$ space, and is based upon battery power $P_{BAT}$ in relation to output torque $T_O$, described with reference to FIG. 6A and Eqs. 1-12. In the illustrative operation shown, the transmission 10 is operating in G2 with CL1=C1 70 and CL2=C2 62. The independently determined parameters include $P_{BAT}$ Min and $P_{BAT}$ Max, plotted as $R_{MIN}$ and $R_{MAX}$ in $T_X/T_Y$ space relative to the second coordinate system K. A net zero battery power line $R_0$ is also shown. The transformed motor torque constraints ('Motor torque constraints') can be determined and plotted in the $T_X/T_Y$ space, or in the $T_A/T_B$ space. The first coordinate system L shows the $T_A/T_B$ space with $T_A$=0 and $T_B$=0, which can be determined in the $T_X/T_Y$ space and plotted relative to the K coordinate system. The two points $T_A$=0, $T_B$=0 and $T_X$=0, $T_Y$=0 define the preferred motor torque split line ('Optimal Motor Torque Split Line'), which comprises a torque split between the first and second electric machines 56 and 72 that achieves minimum power losses and can be determined based upon the motor torque constraints and minimizes battery power for an output torque. Clutch reactive torque ranges comprising minimum, maximum, and zero clutch torques for the first clutch ('$T_{CL1}$MIN', '$T_{CL1}$MAX', '$T_{CL1}$=0') and for the second clutch ('$T_{CL2}$MIN', '$T_{CL2}$MAX', '$T_{CL2}$=0') can be determined relative to the motor torque constraints and battery power constraints and plotted in the $T_X/T_Y$ space relative to the second coordinate system K or the $T_A/T_B$ space relative to the first coordinate system L. The battery powers $P_{BAT}$ Min and $P_{BAT}$ Max are plotted relative to the third coordinate system M which shows $P_{BAT}$ in relationship to output torque $T_O$. The third coordinate system M shows $P_{BAT}$ in relationship to output torque $T_O$, from zero output torque ('$T_O$=0') with increasing output torque, including lines representing the minimum and maximum linear output torques ('$T_O$ Min Lin', '$T_O$ Max Lin'). The maximum and minimum output torques are plotted in the third coordinate system ('To@$P_{BAT}$ MAX Opt' and 'To@$P_{BAT}$ MAX Opt'), and are shown for the positive root case, the derivation of which is described with reference to FIG. 6A. The maximum and minimum output torques translate to the $T_X/T_Y$ space, as shown.

FIG. 10 depicts operation in one of the continuously variable mode operating range states, e.g., Mode 2 for the embodiment described with reference to FIGS. 1 and 2. The preferred output torque at maximum charging battery power ('To@$P_{BAT}$ MIN Opt') is greater than the minimum linear output torque ('$T_O$ Min Lin'), and therefore, the preferred minimum output torque ('D') comprises the output torque at the maximum charging battery power ('To@$P_{BAT}$MIN Opt'), i.e., the output torque that satisfies the battery power constraints ('$P_{BAT}$ MIN'). The preferred output torque at maximum discharging battery power ('To@$P_{BAT}$ MAX Opt') is less than the minimum linear output torque ('$T_O$ Max Lin'), and therefore, the preferred maximum output torque ('C') comprises the output torque at the maximum discharging battery power ('To@$P_{BAT}$ MAX Opt'), i.e., the output torque that satisfies the battery power constraints ('$P_{BAT}$ MAX').

The motor torque commands can be used to control the first and second electric machines 56 and 72 to generate tractive torque and to react tractive torque at the output member 64. Reacting tractive torque comprises reacting torque originating at the wheel(s) 93 that is transferred through the driveline 90 for regenerative operation as a part of vehicle braking or vehicle coastdown. The reactive torque at the output member 64 is transferred to one or both of the first and second electric machines 56 and 72 to generate electric power which can be stored in the ESD 74 or consumed by the other of the first and second electric machines 56 and 72. The motor torque control scheme 340 executes to determine the motor torque commands during each iteration of one of the loop cycles.

It is understood that modifications are allowable within the scope of the disclosure. The disclosure has been described with specific reference to the preferred embodiments and modifications thereto. Further modifications and alterations may occur to others upon reading and understanding the specification. It is intended to include all such modifications and alterations insofar as they come within the scope of the disclosure.

The invention claimed is:

1. Method for controlling a hybrid transmission including first and second torque machines and an energy storage device connected thereto, the hybrid transmission operative to transfer power between an input member and an output member and the first and second torque machines in a continuously variable operating range state, the method comprising:

determining a preferred output torque;
determining a relationship between power from the energy storage device and an output torque of the transmission;
determining power constraints from the energy storage device;
determining motor torque constraints for the first and second torque machines;
determining a first relationship comprising linear output torque constraints correlated to the motor torque constraints for the first and second torque machines and clutch reactive torque constraints;
determining a second relationship comprising quadratic output torque constraints correlated to the power constraints from the energy storage device and the relationship between the power from the energy storage device and the output torque of the transmission device; and
simultaneously solving the first and second relationships to determine an output torque to the output member responsive to the preferred output torque and achievable within the linear output torque constraints and the quadratic output torque constraints.

2. The method of claim 1, comprising determining the preferred output torque based upon an operator torque request.

3. The method of claim 1, further comprising determining the preferred output torque based upon an operator torque request comprising an operator input to a brake pedal, and determining an output torque range to the output member responsive to the preferred output torque and achievable within the linear output torque constraints and the quadratic output torque constraints.

4. The method of claim 3, comprising determining a capacity for regenerative braking based upon the output torque range to the output member that is responsive to the preferred output torque and achievable within the linear output torque constraints and the quadratic output torque constraints.

5. The method of claim 4, further comprising determining an output torque to the output member that is responsive to the preferred output torque and maximizes power flow from the torque machine to the energy storage device and is achievable within the linear output torque constraints and the quadratic output torque constraints.

6. The method of claim 1, further comprising determining an output torque to the output member responsive to the preferred output torque that is achievable within the linear output torque constraints and the quadratic output torque constraints and minimizes power flow from the energy storage device to the torque machine.

7. The method of claim 1, wherein determining the second relationship comprises calculating said quadratic output torque constraints in accordance with the following relationship:

$$T_O(P_{BAT}) = T_O^* \pm \sqrt{\frac{P_{BAT} - P_{BAT}^*}{a_1^2 + b_1^2}}$$

wherein $T_O(P_{BAT})$ is output torque,
$T_O^*$ is an unconstrained optimized output torque,
$P_{BAT}$ is battery power,
$P_{BAT}^*$ is optimized battery power, and
$a_1$ and $b_1$ are application-specific scalar values.

8. The method of claim 1, wherein simultaneously solving the first and second relationships comprises:
transforming the first relationship from a first coordinate system to a second coordinate system;
translating the second relationship from a third coordinate system to the second coordinate system; and
wherein simultaneously solving the first and second relationships comprises simultaneously solving the first relationship transformed to the second coordinate system and the second relationship translated to the second coordinate system.

9. Method for controlling an electro-mechanical transmission including first and second electric machines and an electrical energy storage device connected thereto, the electro-mechanical transmission operative to transfer power between an input member and an output member and the first and second electric machines, the method comprising:
determining a preferred output torque;
determining a relationship between power from the electrical energy storage device and an output torque transmitted to the output member;
determining power constraints from the electrical energy storage device;
determining motor torque constraints for the first and second electric machines;
determining a first relationship comprising output torque constraints corresponding to the motor torque constraints for the first and second electric machines and clutch reactive torque constraints;
determining a second relationship comprising output torque constraints corresponding to the power constraints from the electrical energy storage device and the relationship between the power from the electrical energy storage device and the output torque; and
simultaneously solving the first and second relationships to determine an output torque responsive to the preferred operator torque request and achievable in response to the power constraints from the electrical energy storage device and the relationship between the power from the electrical energy storage device and the output torque and the power constraints from the electrical energy storage device and the relationship between the power from the electrical energy storage device and the output torque.

10. The method of claim 9, comprising determining the preferred output torque in response to an operator torque request.

11. The method of claim 9, further comprising determining the preferred output torque based upon an operator torque request via a brake pedal, and determining an output torque range to the output member responsive to the preferred output torque and achievable in response to the power constraints from the electrical energy storage device and the relationship between the power from the electrical energy storage device and the output torque and the power constraints from the electrical energy storage device and the relationship between the power from the electrical energy storage device and the output torque.

12. The method of claim 11, comprising determining a capacity for regenerative braking based upon the output torque range to the output member that is responsive to the preferred output torque and achievable in response to the power constraints from the electrical energy storage device and the relationship between the power from the electrical energy storage device and the output torque and the power constraints from the electrical energy storage device and the relationship between the power from the electrical energy storage device and the output torque.

13. The method of claim 12, further comprising determining an output torque to the output member that is responsive to the preferred output torque and maximizes power flow from the torque machine to the energy storage device and is achievable in response to the power constraints from the electrical energy storage device and the relationship between the power from the electrical energy storage device and the output torque and the power constraints from the electrical energy storage device and the relationship between the power from the electrical energy storage device and the output torque.

14. The method of claim 13, further comprising determining an output torque to the output member responsive to the preferred output torque that is achievable in response to the power constraints from the electrical energy storage device and the relationship between the power from the electrical energy storage device and the output torque and the power constraints from the electrical energy storage device and the relationship between the power from the electrical energy storage device and the output torque and minimizes power flow from the energy storage device to the torque machine.

15. The method of claim 9, wherein determining the second relationship comprises calculating the output torque constraints in accordance with the following relationship:

$$T_O(P_{BAT}) = T_O^* \pm \sqrt{\frac{P_{BAT} - P_{BAT}^*}{a_1^2 + b_1^2}}$$

wherein $T_O(P_{BAT})$ is output torque,
$T_O^*$ is an unconstrained optimized output torque,
$P_{BAT}$ is battery power,
$P_{BAT}^*$ is an optimized battery power, and
$a_1$ and $b_1$ are application-specific scalar values.

16. The method of claim 9, wherein simultaneously solving the first and second relationships comprises:
    transforming the first relationship from a first coordinate system to a second coordinate system;
    translating the second relationship from a third coordinate system to the second coordinate system; and
    wherein simultaneously solving the first and second relationships comprises simultaneously solving the first relationship transformed to the second coordinate system and the second relationship translated to the second coordinate system.

17. Method for controlling a hybrid transmission including electric machines and an energy storage device connected thereto, the electro-mechanical transmission operative to transfer power between an input member and an output member and the electric machines, the method comprising:
    determining a preferred output torque;
    determining a first relationship between power from the energy storage device and an output torque of the transmission;
    determining power constraints from the energy storage device;
    determining motor torque constraints for the electric machines;
    determining a first relationship including maximum and minimum linear output torque constraints correlated to the motor torque constraints for the electric machines and clutch reactive torque constraints;
    determining a second relationship including maximum and minimum quadratic output torque constraints correlated to the power constraints from the energy storage device and the first relationship between the power from the energy storage device and the output torque of the transmission device; and
    simultaneously solving the first relationship and the second relationship to determine an output torque responsive to the preferred output torque and achievable within the maximum and minimum linear torque constraints and the maximum and minimum quadratic output torque constraints.

* * * * *